(12) United States Patent
Lin et al.

(10) Patent No.: US 10,901,287 B2
(45) Date of Patent: Jan. 26, 2021

(54) DRIVING METHODS FOR COLOR DISPLAY DEVICES

(71) Applicant: E Ink California, LLC., Fremont, CA (US)

(72) Inventors: Craig Lin, Oakland, CA (US); Chi-Mao Hung, Hsinchu (TW)

(73) Assignee: E INK CALIFORNIA, LLC, Fremont, CA (US)

( * ) Notice: Subject to any disclaimer, the term of this patent is extended or adjusted under 35 U.S.C. 154(b) by 168 days.

(21) Appl. No.: 16/280,517

(22) Filed: Feb. 20, 2019

(65) Prior Publication Data
US 2019/0179209 A1 Jun. 13, 2019

Related U.S. Application Data

(62) Division of application No. 15/294,983, filed on Oct. 17, 2016, now Pat. No. 10,254,619, which is a
(Continued)

(51) Int. Cl.
*G02B 26/00* (2006.01)
*G02F 1/167* (2019.01)
(Continued)

(52) U.S. Cl.
CPC ......... *G02F 1/167* (2013.01); *G02F 1/13306* (2013.01); *G09G 3/2003* (2013.01); *G09G 3/344* (2013.01); *G02F 1/1681* (2019.01); *G02F 2001/1678* (2013.01); *G02F 2201/121* (2013.01); *G02F 2201/123* (2013.01);
(Continued)

(58) Field of Classification Search
USPC ........ 359/237, 247, 265–267, 290–292, 295, 359/296, 298, 321–323
See application file for complete search history.

(56) References Cited

U.S. PATENT DOCUMENTS

| 6,017,584 A | 1/2000 | Albert |
| 6,545,797 B2 | 4/2003 | Chen |

(Continued)

FOREIGN PATENT DOCUMENTS

| FR | 2981084 A1 | 4/2013 |
| JP | 2009251032 A | 10/2009 |

OTHER PUBLICATIONS

Kao, W.C., Ye, J.A. and Lin, C. (Jan. 2009) Image Quality Improvement for Electrophoretic Displays by Combining Contrast Enhancement and Halftoning Techniques. ICCE 2009 Digest of Technical Papers, 11.2-2. Jan. 14, 2009.
(Continued)

*Primary Examiner* — Brandi N Thomas
(74) *Attorney, Agent, or Firm* — David J. Cole

(57) ABSTRACT

The present invention provides driving methods for electrophoretic color display devices. The backplane system used for the driving methods is found to be simpler which renders color display devices more cost effective. More specifically, the driving method comprises first driving all pixels towards a color state by modulating only the common electrode, followed by driving all pixels towards their desired color states by maintaining the common electrode grounded and applying different voltages to the pixel electrodes.

12 Claims, 20 Drawing Sheets

Related U.S. Application Data division of application No. 14/279,125, filed on May 15, 2014, now Pat. No. 9,501,981.

(60) Provisional application No. 61/824,928, filed on May 17, 2013.

(51) Int. Cl.
| | |
|---|---|
| *G09G 3/20* | (2006.01) |
| *G09G 3/34* | (2006.01) |
| *G02F 1/133* | (2006.01) |
| *G02F 1/1681* | (2019.01) |
| *G02F 1/1675* | (2019.01) |

(52) U.S. Cl.
CPC ... *G02F 2203/34* (2013.01); *G09G 2310/063* (2013.01); *G09G 2310/068* (2013.01)

(56) References Cited

U.S. PATENT DOCUMENTS

| | | |
|---|---|---|
| 6,664,944 B1 | 12/2003 | Albert |
| 6,751,007 B2 | 6/2004 | Liang |
| 6,788,452 B2 | 9/2004 | Liang |
| 6,864,875 B2 | 3/2005 | Drzaic |
| 6,914,714 B2 | 7/2005 | Chen |
| 6,972,893 B2 | 12/2005 | Chen |
| 7,038,655 B2 | 5/2006 | Herb |
| 7,038,656 B2 | 5/2006 | Liang |
| 7,038,670 B2 | 5/2006 | Liang |
| 7,046,228 B2 | 5/2006 | Liang |
| 7,052,571 B2 | 5/2006 | Wang |
| 7,075,502 B1 | 7/2006 | Drzaic |
| 7,167,155 B1 | 1/2007 | Albert |
| 7,342,556 B2 | 3/2008 | Oue |
| 7,385,751 B2 | 6/2008 | Chen |
| 7,492,505 B2 | 2/2009 | Liang |
| 7,652,656 B2 | 1/2010 | Chopra |
| 7,667,684 B2 | 2/2010 | Jacobson |
| 7,684,108 B2 | 3/2010 | Wang |
| 7,791,789 B2 | 9/2010 | Albert |
| 7,800,813 B2 | 9/2010 | Wu |
| 7,821,702 B2 | 10/2010 | Liang |
| 7,834,844 B2 | 11/2010 | Kim |
| 7,839,564 B2 | 11/2010 | Whitesides et al. |
| 7,848,009 B2 | 12/2010 | Machida |
| 7,859,741 B2 | 12/2010 | Chikazawa |
| 7,872,633 B2 | 1/2011 | Zhou |
| 7,910,175 B2 | 3/2011 | Webber |
| 7,952,790 B2 | 5/2011 | Honeyman |
| 7,956,841 B2 | 6/2011 | Albert |
| 7,982,941 B2 | 7/2011 | Lin |
| 8,040,594 B2 | 10/2011 | Paolini, Jr. |
| 8,054,526 B2 | 11/2011 | Bouchard |
| 8,098,418 B2 | 1/2012 | Paolini, Jr. |
| 8,159,636 B2 | 4/2012 | Sun |
| 8,213,076 B2 | 7/2012 | Albert |
| 8,363,299 B2 | 1/2013 | Paolini, Jr. |
| 8,422,116 B2 | 4/2013 | Sprague |
| 8,441,714 B2 | 5/2013 | Paolini, Jr. |
| 8,441,716 B2 | 5/2013 | Paolini, Jr. |
| 8,462,102 B2 | 6/2013 | Wong |
| 8,466,852 B2 | 6/2013 | Drzaic |
| 8,503,063 B2 | 8/2013 | Sprague |
| 8,576,470 B2 | 11/2013 | Paolini, Jr. |
| 8,576,475 B2 | 11/2013 | Huang |
| 8,593,721 B2 | 11/2013 | Albert |
| 8,605,354 B2 | 12/2013 | Zhang |
| 8,649,084 B2 | 2/2014 | Wang |
| 8,670,174 B2 | 3/2014 | Sprague |
| 8,704,753 B2 | 4/2014 | Miyazaki |
| 8,704,756 B2 | 4/2014 | Lin |
| 8,717,664 B2 | 5/2014 | Wang |
| 8,786,935 B2 | 7/2014 | Sprague |
| 8,797,634 B2 | 8/2014 | Paolini, Jr. |
| 8,810,899 B2 | 8/2014 | Sprague |
| 8,830,559 B2 | 9/2014 | Honeyman |
| 8,873,129 B2 | 10/2014 | Paolini, Jr. |
| 8,902,153 B2 | 12/2014 | Bouchard |
| 8,902,491 B2 | 12/2014 | Wang |
| 8,917,439 B2 | 12/2014 | Wang |
| 8,964,282 B2 | 2/2015 | Wang |
| 9,013,783 B2 | 4/2015 | Sprague |
| 9,116,412 B2 | 8/2015 | Lin |
| 9,146,439 B2 | 9/2015 | Zhang |
| 9,164,207 B2 | 10/2015 | Honeyman |
| 9,170,467 B2 | 10/2015 | Whitesides |
| 9,170,468 B2 | 10/2015 | Lin |
| 9,182,646 B2 | 11/2015 | Paolini, Jr. |
| 9,195,111 B2 | 11/2015 | Anseth |
| 9,199,441 B2 | 12/2015 | Danner |
| 9,268,191 B2 | 2/2016 | Paolini, Jr. |
| 9,285,649 B2 | 3/2016 | Du |
| 9,293,511 B2 | 3/2016 | Jacobson |
| 9,341,916 B2 | 5/2016 | Telfer et al. |
| 9,360,733 B2 | 6/2016 | Wang |
| 9,361,836 B1 | 6/2016 | Telfer |
| 9,383,623 B2 | 7/2016 | Lin |
| 9,423,666 B2 | 8/2016 | Wang |
| 9,459,510 B2 | 10/2016 | Lin |
| 9,513,527 B2 | 12/2016 | Chan |
| 9,541,814 B2 | 1/2017 | Lin |
| 9,671,668 B2 | 6/2017 | Chan |
| 9,697,778 B2 | 7/2017 | Telfer |
| 9,740,076 B2 | 8/2017 | Paolini |
| 9,759,980 B2 | 9/2017 | Du |
| 9,812,073 B2 | 11/2017 | Lin et al. |
| 10,037,735 B2 | 7/2018 | Amundson |
| 10,162,242 B2 | 12/2018 | Wang |
| 10,209,556 B2 | 2/2019 | Rosenfeld |
| 2007/0268244 A1 * | 11/2007 | Chopra .................. G09G 3/344 345/107 |
| 2008/0043318 A1 | 2/2008 | Whitesides |
| 2008/0048970 A1 | 2/2008 | Drzaic |
| 2009/0225398 A1 | 9/2009 | Duthaler |
| 2010/0156780 A1 | 6/2010 | Jacobson |
| 2010/0194733 A1 | 8/2010 | Lin |
| 2011/0043543 A1 | 2/2011 | Chen |
| 2011/0175939 A1 | 7/2011 | Moriyama |
| 2012/0326957 A1 | 12/2012 | Drzaic |
| 2013/0242378 A1 | 9/2013 | Paolini, Jr. |
| 2013/0278995 A1 | 10/2013 | Drzaic |
| 2014/0009818 A1 | 1/2014 | Brochon |
| 2014/0055840 A1 | 2/2014 | Zang |
| 2014/0078576 A1 | 3/2014 | Sprague |
| 2014/0362213 A1 | 12/2014 | Tseng |
| 2015/0097877 A1 | 4/2015 | Lin |
| 2015/0118390 A1 | 4/2015 | Rosenfeld |
| 2015/0268531 A1 | 9/2015 | Wang |
| 2015/0301246 A1 | 10/2015 | Zang |
| 2016/0026062 A1 | 1/2016 | Zhang |
| 2016/0048054 A1 | 2/2016 | Danner |

OTHER PUBLICATIONS

Kao, W.C., Ye, J.A., Chu, M.I and Su, C.Y. (Feb. 2009) Image Quality Improvement for Electrophoretic Displays by Combining Contrast Enhancement and Halftoning Techniques. IEEE Transactions on Consumer Electronics, 2009, vol. 55, Issue 1, pp. 15-19. Feb. 1, 2009.

European Patent Office, EP Appl. No. 14797909.0, Extended European Search Report, dated Sep. 16, 2016. Sep. 16, 2016.

Korean Intellectual Property Office, PCT/US2014/038234, International Search Report and Written Opinion, dated Sep. 25, 2014.

* cited by examiner

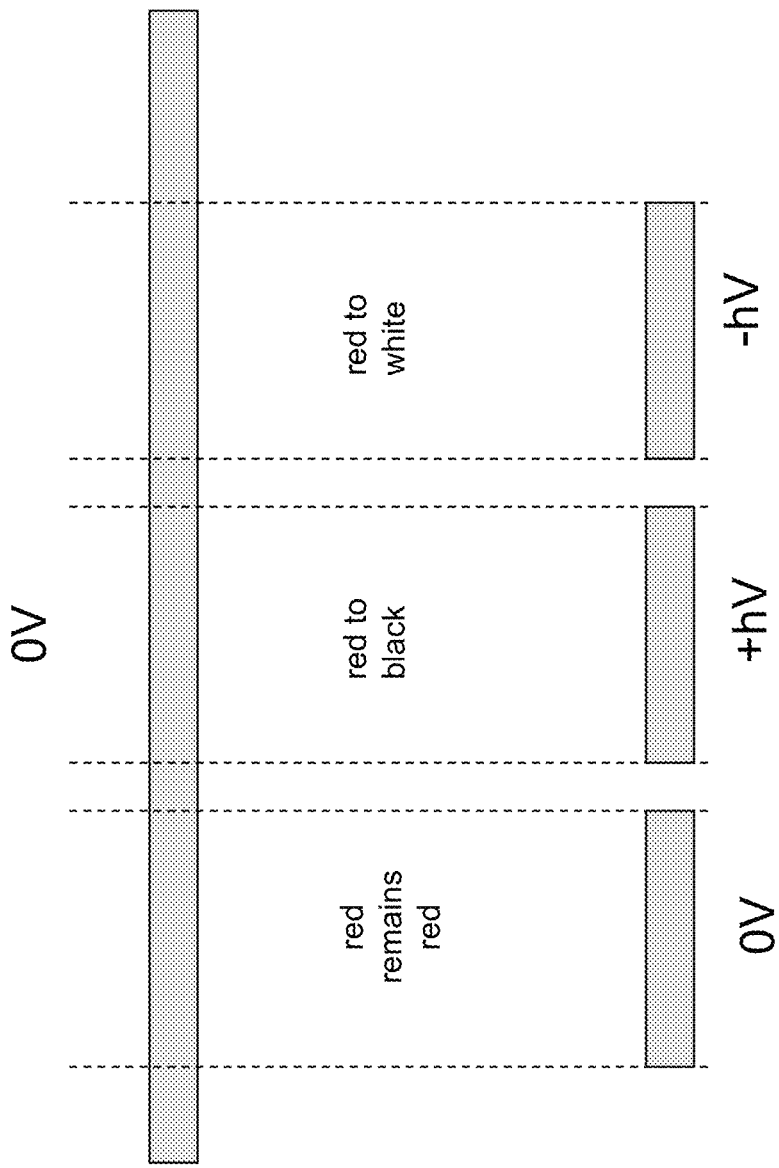

DRIVING METHODS FOR COLOR DISPLAY DEVICES

REFERENCE TO RELATED APPLICATIONS

This application is a division of copending application Ser. No. 15/294,983, filed Oct. 17, 2016 (Publication No. 2017/0031229), which itself is a division of application Ser. No. 14/279,125, filed May 15, 2014 (Publication No. 2014/0340734, now U.S. Pat. No. 9,501,981, issued Nov. 22, 2016), which claims the priority of U.S. Provisional Application No. 61/824,928, filed May 17, 2013; the contents of all the aforementioned applications are incorporated herein by reference in their entirety.

BACKGROUND OF INVENTION

The present invention is directed to driving methods for color display devices. The methods can greatly reduce complexity of the active matrix backplane used for this type of display devices.

In order to achieve a color display, color filters are often used. The most common approach is to add color filters on top of black/white sub-pixels of a pixellated display to display the red, green and blue colors. The biggest disadvantage of such a technique is that the white level is normally substantially less than half of that of a black and white display, rendering it an unacceptable choice for display devices, such as e-readers or displays that need well readable black-white brightness and contrast.

SUMMARY OF INVENTION

A first aspect of the invention is directed to a driving method for a display device comprising
  (i) an electrophoretic fluid which fluid comprises a first type of particles, a second type of particles and a third type of particles, all of which are dispersed in a solvent or solvent mixture, wherein the first type of particles carry a charge polarity while the second and third types of particles carry opposite charge polarity, and
  (ii) a plurality of pixels wherein each pixel is sandwiched between a common electrode and a pixel electrode, which method comprises
    a) applying no voltage to the pixel electrodes and applying a high voltage to the common electrode wherein the high voltage has a polarity opposite of the charge polarity of the first type of particles, to drive all pixels towards the color state of the first type of particles;
    b) applying no voltage to the pixel electrodes and applying a low voltage to the common electrode wherein the low voltage has a polarity opposite of the charge polarity of the third type of particles, to drive all pixels towards the color state of the third type of particles; and
    c) maintaining the common electrode grounded and applying different voltages to the pixel electrodes to drive pixels towards their desired color states.

In one embodiment, in step (c), no voltage is applied to the pixel electrodes to maintain the pixels in the color state of the third type of particles.

In one embodiment, in step (c), a high voltage is applied to the pixel electrodes wherein the high voltage has the same polarity as the second type of particles to drive the pixels towards the color state of the second type of particles.

In one embodiment, in step (c), a high voltage is applied to the pixel electrodes wherein the high voltage has the same polarity as the first type of particles to drive the pixels towards the color state of the first type of particles.

In one embodiment, the method further comprises a shaking waveform prior to step (a).

In one embodiment, the first type of particles is negatively charged and the second and third types of particles are positively charged.

In one embodiment, the first type of particles is white particles, the second type of particles is black particles and the third type of particles is non-white and non-black particles.

A second aspect of the invention is directed to a driving method for a display device comprising
  (i) an electrophoretic fluid which fluid comprises a first type of particles, a second type of particles, a third type of particles and a fourth type of particles, all of which are dispersed in a solvent or solvent mixture, wherein the first and second types of particles are oppositely charged and the third and fourth types of particles are oppositely charged, and
  (ii) a plurality of pixels wherein each pixel is sandwiched between a common electrode and a pixel electrode, which method comprises
    a) applying no voltage to the pixel electrodes and applying a high voltage to the common electrode wherein the high voltage has a polarity opposite of the charge polarity of the second type of particles, to drive all pixels towards the color state of the second type of particles;
    b) applying no voltage to the pixel electrodes and applying a low voltage to the common electrode wherein the low voltage has a polarity opposite of the charge polarity of the third type of particles, to drive all pixels towards the color state of the third type of particles; and
    c) maintaining the common electrode grounded and applying different voltages to the pixel electrodes to drive pixels towards their desired color states.

In one embodiment, in step (c), no voltage is applied to the pixel electrodes to maintain the pixels in the color state of the third type of particles.

In one embodiment, in step (c), a high voltage is applied to the pixel electrodes wherein the high voltage has the same polarity as the first type of particles to drive the pixels towards the color state of the first type of particles.

In one embodiment, in step (c), a high voltage is applied to the pixel electrodes wherein the high voltage has the same polarity as the second type of particles to drive the pixels towards the color state of the second type of particles.

In one embodiment, in step (c), a high voltage is applied to the pixel electrodes wherein the high voltage has the same polarity as the first type of particles, followed by applying a low voltage to the pixel electrodes wherein the low voltage has the same polarity as the fourth type of particles to drive the pixels towards the color state of the fourth type of particles.

In one embodiment, the method further comprises a shaking waveform prior to step (a).

In one embodiment, the first and third types of particles are positively charged and the second and fourth types of particles are negatively charged.

In one embodiment, the first type of particles is black particles, the second type of particles is yellow particles, the third type of particles is red particles and the fourth type of particles is white particles.

In one embodiment, the first type of particles is high positive particles, the second type of particles is high negative particles, the third type of particles is low positive particles and the fourth type of particles is low negative particles.

A third aspect of the invention is directed to a driving method for a color display device comprising a plurality of pixels, wherein each of the pixels is sandwiched between a common electrode and a pixel electrode, the method comprises:
  a) driving all pixels towards a color state by modulating only the common electrode; and
  b) driving all pixels towards their desired color states by maintaining the common electrode grounded and applying different voltages to the pixel electrodes.

In one embodiment, the method further comprises a shaking waveform.

A fourth aspect of the invention is directed to a backplane system for driving a display device comprising an electrophoretic fluid wherein the fluid comprises a first type of particles, a second type of particles and a third type of particles, all of which are dispersed in a solvent or solvent mixture, wherein the first type of particles carry a charge polarity while the second and third types of particles carry opposite charge polarity, which backplane system has only three levels of voltage, 0V, a high positive voltage and a high negative voltage.

A fifth aspect of the invention is directed to a backplane system for driving a display device comprising an electrophoretic fluid wherein the fluid comprises a first type of particles, a second type of particles, a third type of particles and a fourth type of particles, all of which are dispersed in a solvent or solvent mixture, wherein the first and second types of particles are oppositely charged and the third and fourth types of particles are oppositely charged, which backplane system has only four levels of voltage, 0V, a high positive voltage, a high negative voltage and a low positive voltage or a low negative voltage.

BRIEF DESCRIPTION OF DRAWINGS

FIGS. 4A, 4B and 5 illustrate a driving method of the present invention for the three particle fluid system.

DETAILED DESCRIPTION

General:

A display fluid of the present invention may comprise three or four types of particles. The multiple types of particles may be of any colors as long as the colors are visually distinguishable. In the fluid, the particles are dispersed in a solvent or solvent mixture.

For white particles, they may be formed from an inorganic pigment, such as $TiO_2$, $ZrO_2$, ZnO, $Al_2O_3$, $Sb_2O_3$, $BaSO_4$, $PbSO_4$ or the like.

For black particles, they may be formed from CI pigment black 26 or 28 or the like (e.g., manganese ferrite black spinel or copper chromite black spinel) or carbon black.

The colored particles (non-white and non-black) may be of a color such as red, green, blue, magenta, cyan or yellow. The pigments for this type of particles may include, but are not limited to, CI pigment PR254, PR122, PR149, PG36, PG58, PG7, PB28, PB15:3, PY138, PY150, PY155 and PY20. These are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

In addition to the colors, the multiple types of particles may have other distinct optical characteristics, such as optical transmission, reflectance, or luminescence or, in the case of displays intended for machine reading, pseudo-color in the sense of a change in reflectance of electromagnetic wavelengths outside the visible range.

Figure 1:
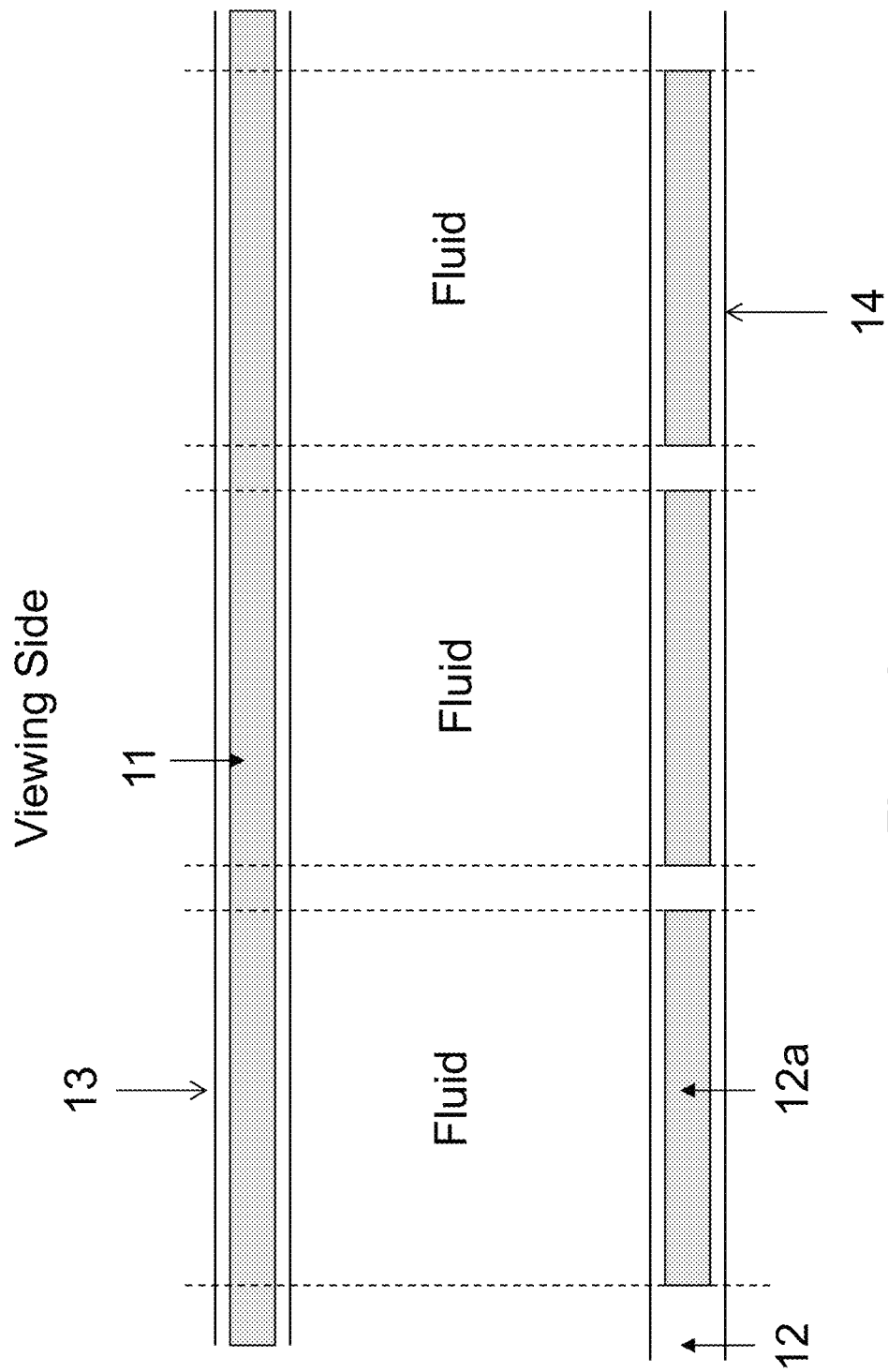
FIG. 1 depicts a display layer of the present invention.

A display layer utilizing a display fluid of the present invention, as shown in FIG. 1, has two surfaces, a first surface (13) on the viewing side and a second surface (14) on the opposite side of the first surface (13). The display fluid is sandwiched between the two surfaces. On the side of the first surface (13), there is a common electrode (11) which is a transparent electrode layer (e.g., ITO), spreading over the entire top of the display layer. On the side of the second surface (14), there is an electrode layer (12) which comprises a plurality of pixel electrodes (12a).

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

Each space between two dotted vertical lines in FIG. 1 denotes a pixel. As shown, each pixel has a corresponding pixel electrode. An electric field is created for a pixel by the potential difference between a voltage applied to the common electrode and a voltage applied to the corresponding pixel electrode.

The multiple types of particles may have different charge levels. In one embodiment, the weaker charged particles have charge intensity being less than about 50%, or about 5% to about 30%, the charge intensity of the stronger charged particles. In another embodiment, the weaker charged particles have charge intensity being less than about 75%, or about 15% to about 55%, the charge intensity of the stronger charged particles. In a further embodiment, the comparison of the charge levels as indicated applies to two types of particles having the same charge polarity.

The charge intensity may be measured in terms of zeta potential. In one embodiment, the zeta potential is determined by Colloidal Dynamics AcoustoSizer IIM with a CSPU-100 signal processing unit, ESA EN #Attn flow through cell (K:127). The instrument constants, such as density of the solvent used in the sample, dielectric constant of the solvent, speed of sound in the solvent, viscosity of the solvent, all of which at the testing temperature (25.degree. C.) are entered before testing. Pigment samples are dispersed in the solvent (which is usually a hydrocarbon fluid having less than 12 carbon atoms), and diluted to between 5-10% by weight. The sample also contains a charge control agent (Solsperse®. 17000, available from Lubrizol Corporation, a Berkshire Hathaway company), with a weight ratio of 1:10 of the charge control agent to the particles. The mass of the diluted sample is determined and the sample is then loaded into the flow through cell for determination of the zeta potential.

If there are two pairs of high-low charge particles in the same fluid, the two pairs may have different levels of charge differentials. For example, in one pair, the low positively charged particles may have a charge intensity which is 30% of the charge intensity of the high positively charged particles. In another pair, the low negatively charged particles may have a charge intensity which is 50% of the charge intensity of the high negatively charged particles.

The solvent in which the multiple types of particles are dispersed is clear and colorless. It preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotri fluoride, chloropentafluorobenzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC-200).

In the present invention, at least one type of particles may demonstrate an electric field threshold. In one embodiment, one type of the higher charged particles has an electric field threshold.

The term "electric field threshold", in the context of the present invention, is defined as the maximum electric field that may be applied for a period of time (typically not longer than 30 seconds, preferably not longer than 15 seconds), to a group of particles, without causing the particles to appear at the viewing side of a pixel, when the pixel is driven from a color state different from the color state of the group of particles. The term "viewing side", in the present application, refers to the first surface in a display layer where images are seen by the viewers.

The electric field threshold is either an inherent characteristic of the charged particles or an additive-induced property.

In the former case, the electric field threshold is generated, relying on certain attraction force between oppositely charged particles or between particles and certain substrate surfaces.

In the case of additive-induced electric field threshold, a threshold agent which induces or enhances the threshold characteristics of an electrophoretic fluid may be added. The threshold agent may be any material which is soluble or dispersible in the solvent or solvent mixture of the electrophoretic fluid and carries or induces a charge opposite to that of the charged particles. The threshold agent may be sensitive or insensitive to the change of applied voltage. The term "threshold agent" may broadly include dyes or pigments, electrolytes or polyelectrolytes, polymers, oligomers, surfactants, charge controlling agents and the like.

Figure 2:
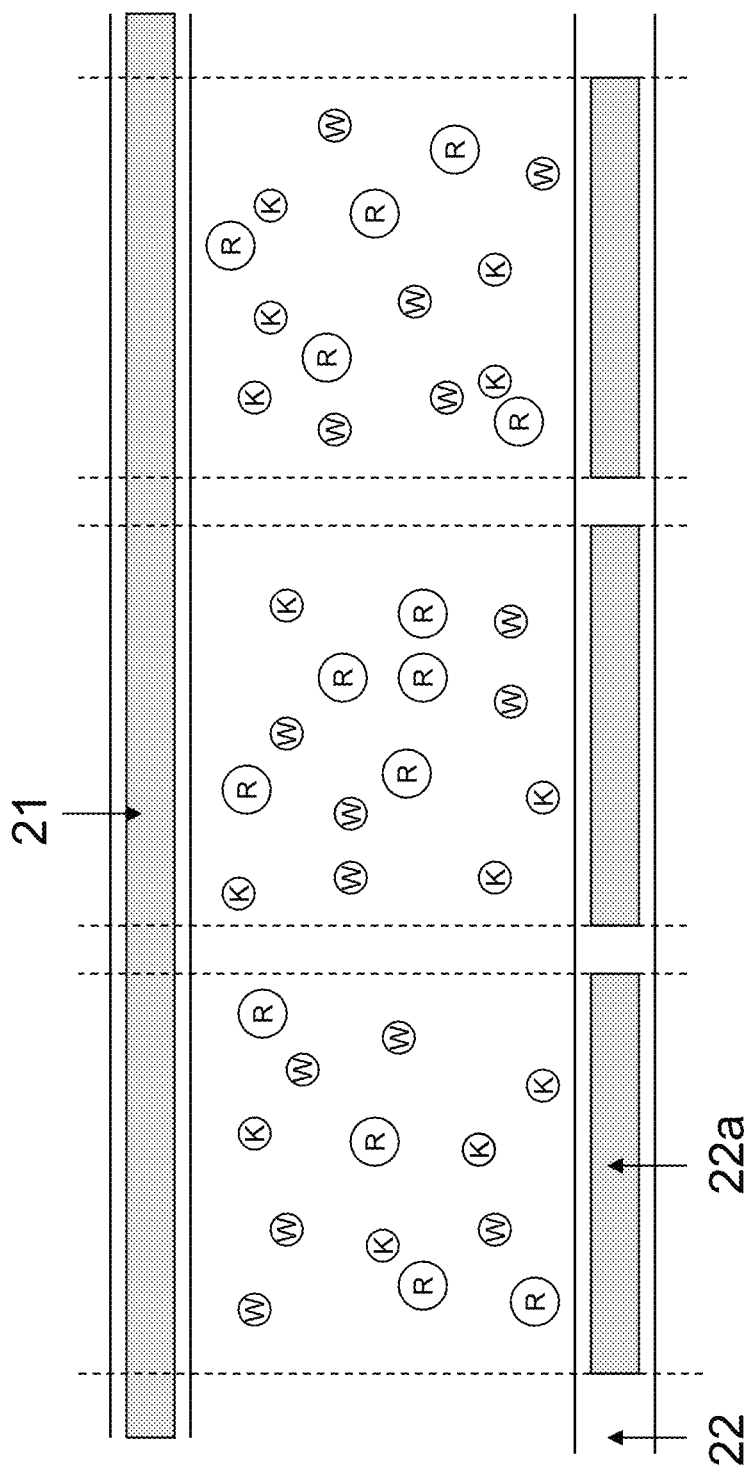
FIG. 2 depicts an electrophoretic fluid comprising three types of particles.

Three Particle System:

FIG. 2 depicts a three particle fluid system as described in US 2014/0092466; the content of which is incorporated herein by reference in its entirety.

The electrophoretic fluid comprises three types of particles dispersed in a dielectric solvent or solvent mixture. For ease of illustration, the three types of particles may be referred to as a first type of particles, a second type of particles and a third type of particles. As an example shown in FIG. 2, the first type of particles is white particles (W); the second type of particles is black particles (K); and the third type of particles is red particles (R). The third type of particles can be any colors of non-white and non-black.

Two of the three types of particles (i.e., the first and second types of particles) have opposite charge polarities and the third type of particles carries the same charge polarity as one of the other two types of particles. For example, if the black particles are positively charged and the white particles are negatively charged, and then the red particles are either positively charged or negatively charged.

FIG. 3 demonstrates the driving sequence of this type of color display device. For illustration purpose, the white particles (W) are negatively charged while the black particles (K) are positively charged. The red particles (R) carry the same charge polarity as the black particles (K).

Because of the attraction force between the black and white particles, the black particles (K) are assumed to have an electric field threshold of λV. Therefore, the black particles would not move to the viewing side if an applied voltage potential difference is W or lower.

The red particles carry a charge weaker than that of the black and white particles. As a result, the black particles move faster than the red particles (R), when an applied voltage potential is higher than λV because of the stronger charge carried by the black particles.

Figure 3A:
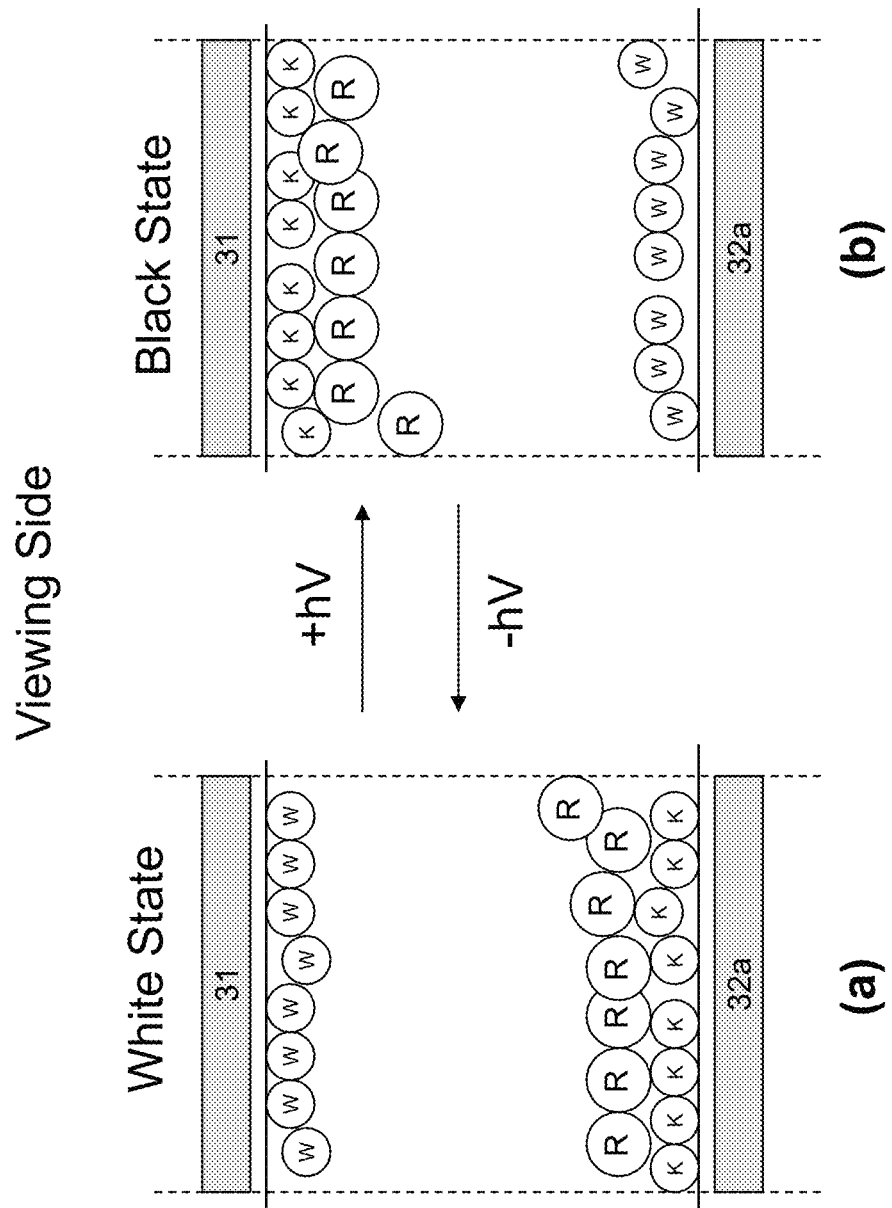
FIGS. 3A-3B illustrate the driving sequence of the three particle fluid system.

In FIG. 3A, a high positive voltage potential difference, +hV, is applied. In this case, the white particles (W) move to be near or at the pixel electrode (32a) and the black particles (K) and the red particles (R) move to be near or at the common electrode (31). As a result, a black color is seen at the viewing side. The red particles (R) move towards the common electrode (31); however because they carry lower charge, they move slower than the black particles (K).

Figure 3B:
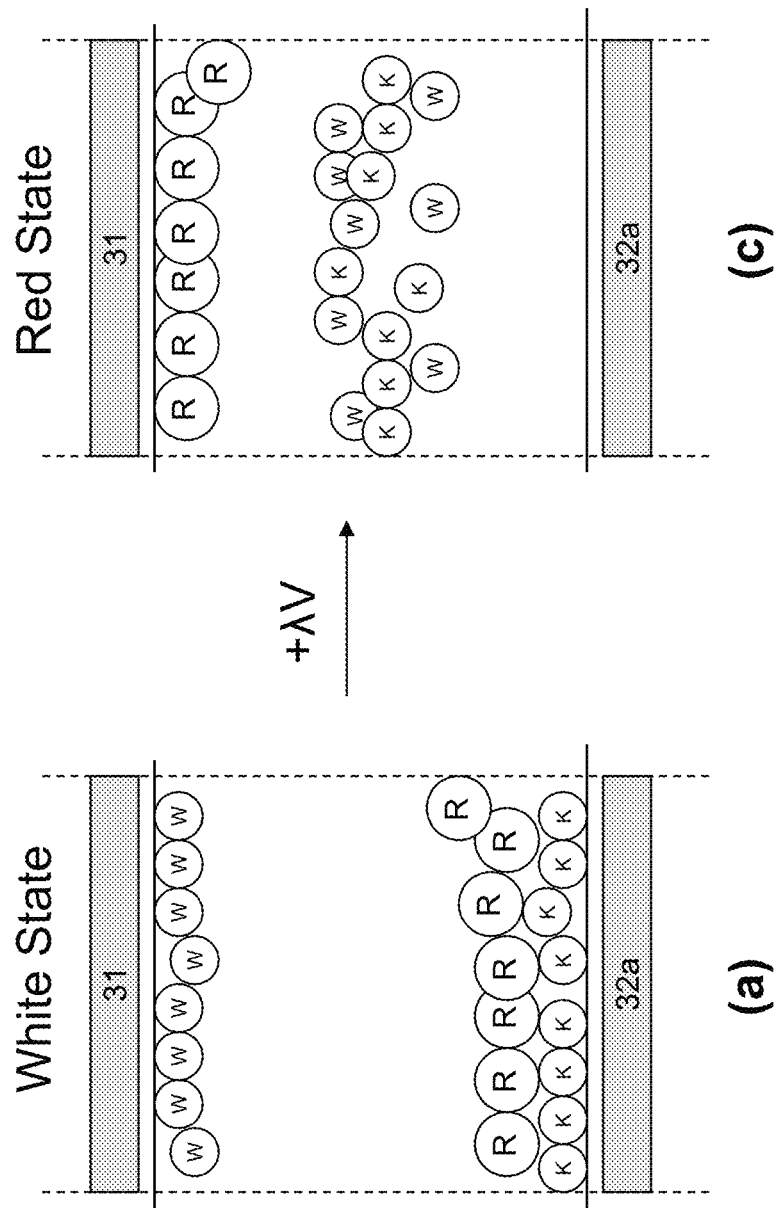

In FIG. 3B, when a high negative potential difference, −hV, is applied, the white particles (W) move to be near or at the common electrode (31) and the black particles (K) and the red particles (R) move to be near or at the pixel electrode (32a). As a result, a white color is seen at the viewing side. The red particles (R) move towards the pixel electrode because they are also positively charged. However, because of their lower charge intensity, they move slower than the black particles.

In FIG. 3C, a low positive voltage potential difference, +λV, is applied to the pixel of FIG. 3A (i.e., driving from the white color state). In this case, the negatively charged white particles (W) in FIG. 3A move towards the pixel electrode (32a). The black particles (K) move little because of their electric field threshold being λV. Due to the fact that the red particles (R) do not have a significant electric field threshold, they move to be near or at the common electrode (31) and as a result, a red color is seen at the viewing side.

It is noted that the lower voltage (+λV or −λV) applied usually has a magnitude of about 5% to about 50% of the magnitude of the full driving voltage required to drive the pixel from the black state to the white state (−hV) or from the white state to the black state (+hV). In one embodiment, +hV and −hV may be +15V and −15V, respectively and +λV and −λV may be +3V and −3V, respectively. In addition, it is noted that the magnitudes of +hV and −hV may be the same or different. Likewise, the magnitude of +λV and −λV may be the same or different.

The term "driving voltage potential difference" refers to the voltage difference between the common electrode and a pixel electrode. In the previous driving method, the common electrode shared by all pixels remains grounded and each pixel is driven by the voltage applied to the corresponding pixel electrode. If such an approach is used to drive the fluid system as described in FIGS. 2 and 3, the backplane system would need to have each pixel electrode at least four different levels of voltages, 0V, +hV, −hV and +λV. Such a backplane system is costly to implement, which is explained in a section below.

The present inventors now propose a new driving method where the backplane system is simplified while color states of high quality can still be displayed.

Figure 4A:
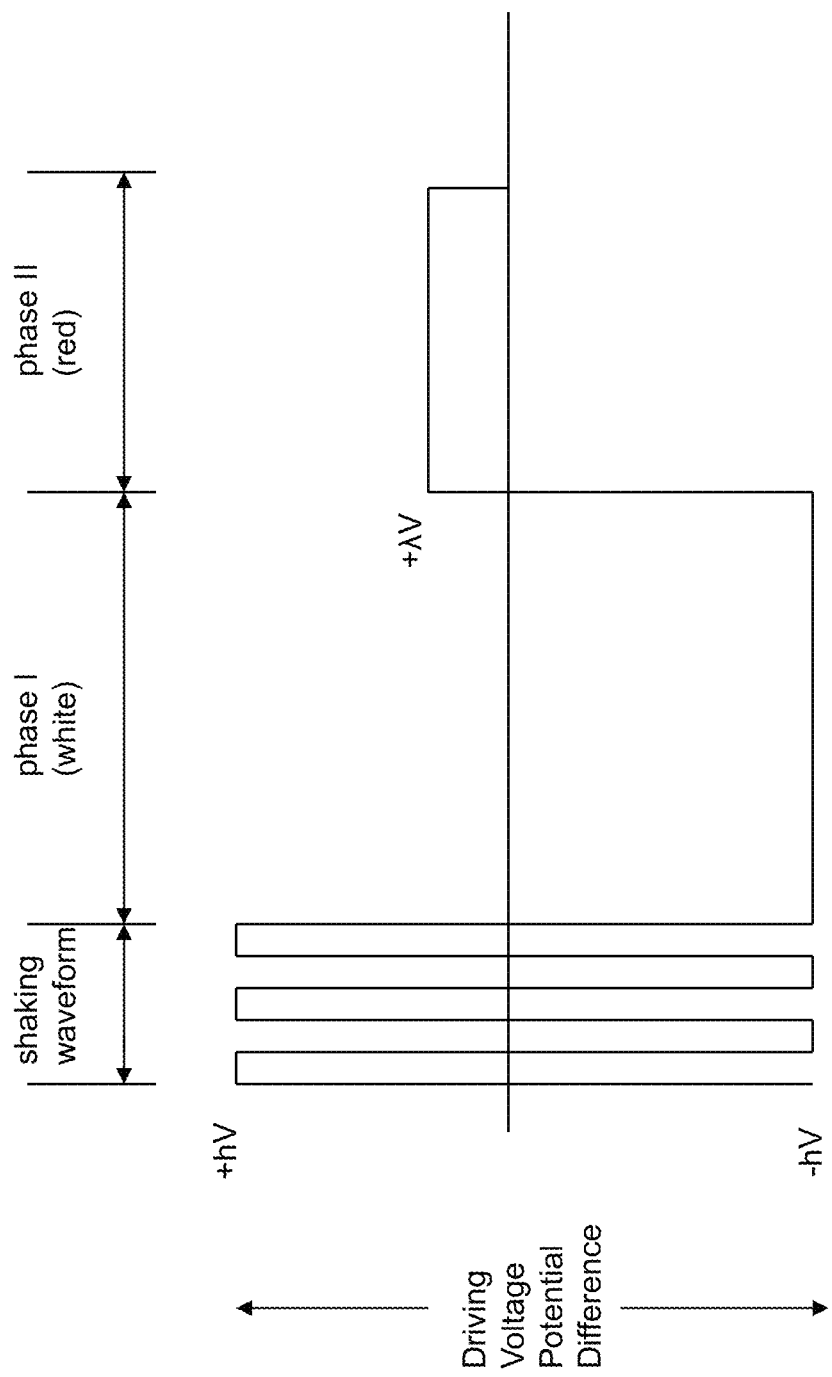
Figure 4B:
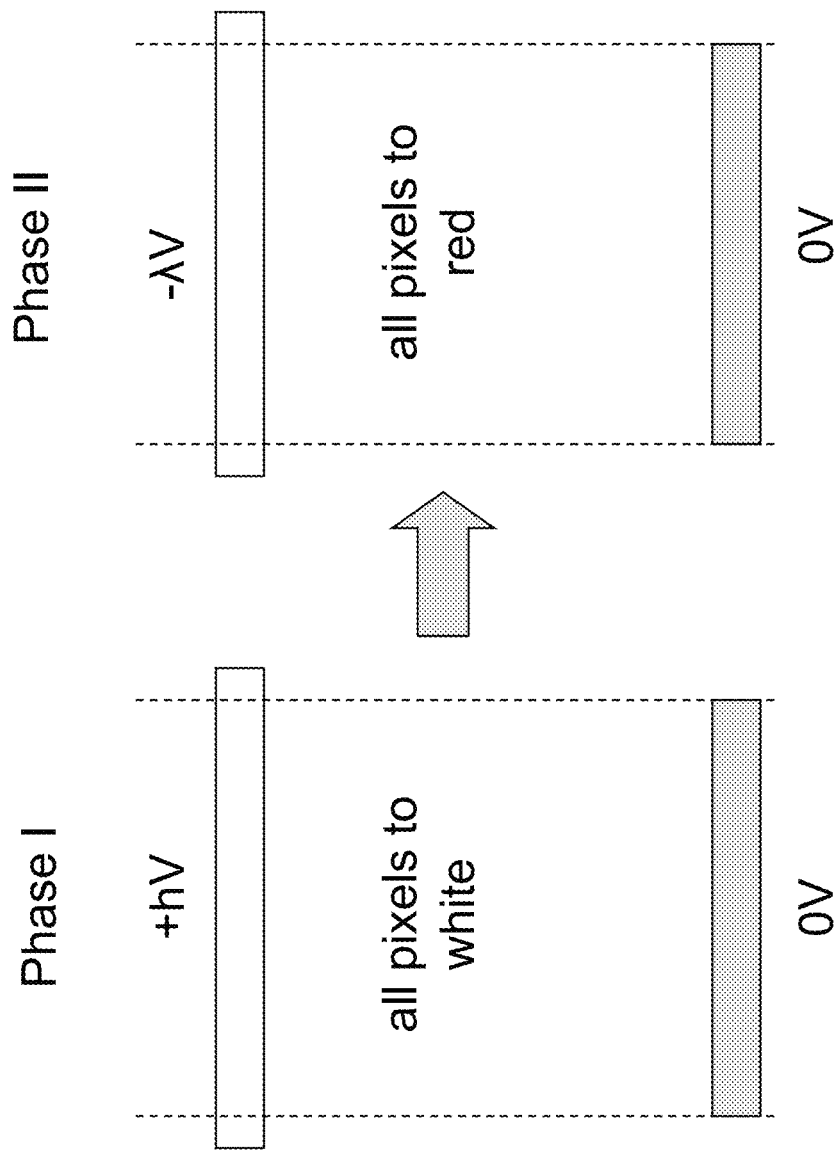

FIGS. 4A and 4B illustrate the initial step of the present driving method and this step is applied to all pixels. A shaking waveform is first applied, after which in phase I, the common electrode shared by all pixels is applied a +hV while all pixel electrodes are at 0V, resulting in a driving voltage potential difference of −hV for all pixels, which drive all of them towards the white state (see FIG. 3A). In phase II, −λV is applied to the common electrode while all pixel electrodes still remain at 0V, resulting in a driving voltage potential difference of +λV, which drives all pixels towards the red state (see FIG. 3c). In this initial step, all pixel electrodes remain at 0V while the common electrode is modulated, switching from +hV to −λV.

The shaking waveform applied before phase I consists of a pair of opposite driving pulses for many cycles. For example, the shaking waveform may consist of a +15V pulse for 20 msec and a −15V pulse for 20 msec and such a pair of pulses is repeated for 50 times. The total time of such a shaking waveform would be 2000 msec.

With this added shaking waveform, the color state (i.e., red) can be significantly better than that without the shaking waveform, on both color brightness and color purity. This is an indication of better separation of the white particles from the red particles as well as the black particles from the red particles.

Each of the driving pulses in the shaking waveform is applied for not exceeding half of the driving time from the full black state to the full white state or vice versa. For example, if it takes 300 msec to drive a display device from a full black state to a full white state or vice versa, the shaking waveform may consist of positive and negative pulses, each applied for not more than 150 msec. In practice, it is preferred that the pulses are shorter.

FIG. 5 illustrates the next step of the driving method. In this step, all pixels are driven simultaneously to their desired color states. In this step, the common electrode is grounded at 0V while different voltages are applied to the pixel electrodes. For pixels that remain in the red state, no voltage is applied to the corresponding pixel electrodes, resulting in no driving voltage potential difference. For pixels to be in the black state, a +hV is applied to the corresponding pixel electrodes. For pixels to be in the white state, a −hV is applied to the corresponding pixel electrodes.

With this driving method in which the common electrode is modulated in the initial step, the backplane system would only need to have each pixel electrode at three different levels of voltage, 0V, +hV and −hV, which is much simplified than the backplane system used in the previous method.

Figure 10A:
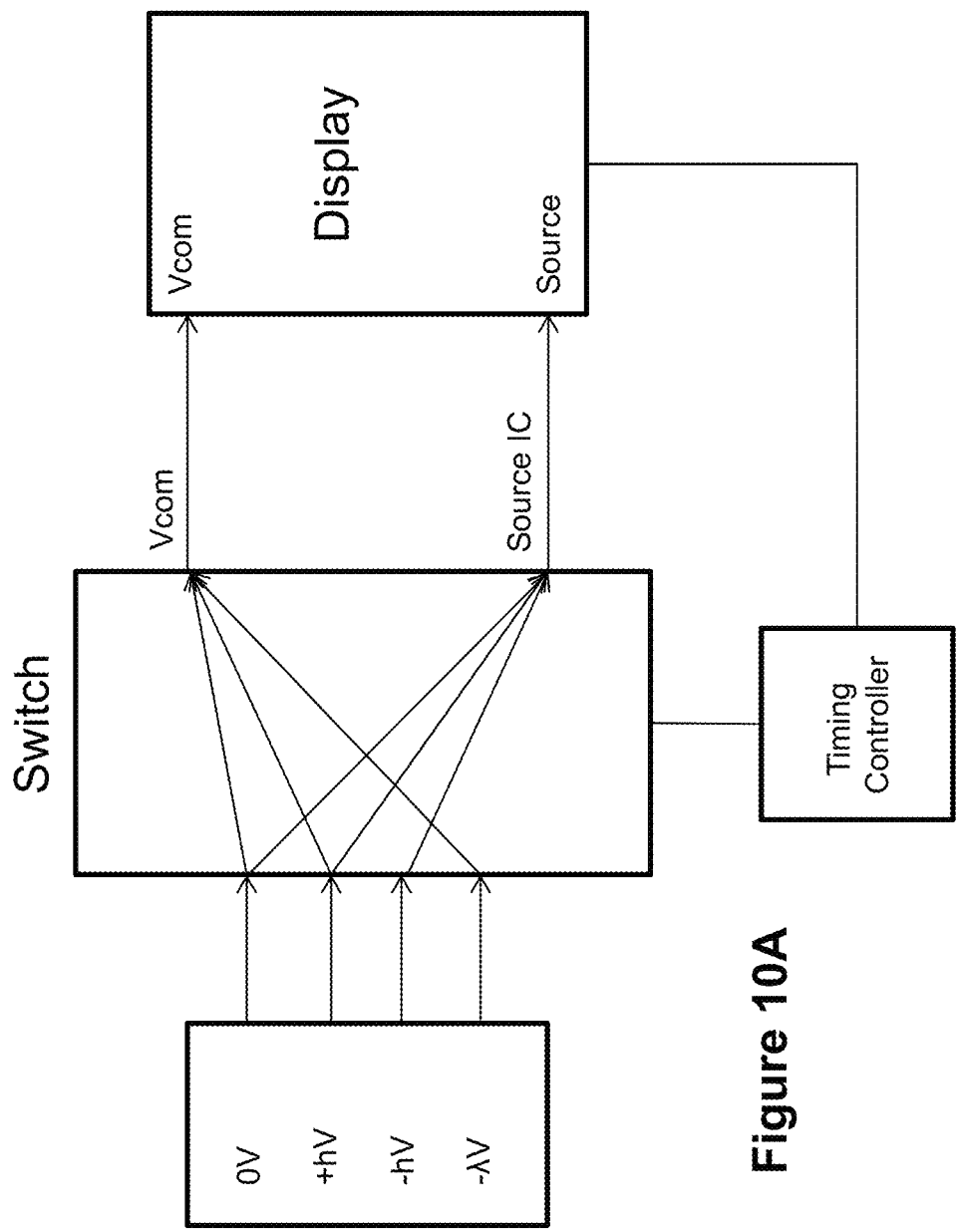
FIGS. 10A, 11A and 12A are diagrams for implementation of the present driving methods.

FIG. 10A is a simplified diagram illustrating the implementation of the present driving method. As shown, there are three different levels of voltage, 0V, +hV and −λV, which may be applied to the common electrode (Vcom) and there are three different levels of voltage, 0V, +hV and −hV, which may be applied to a pixel electrode.

Figure 10B:
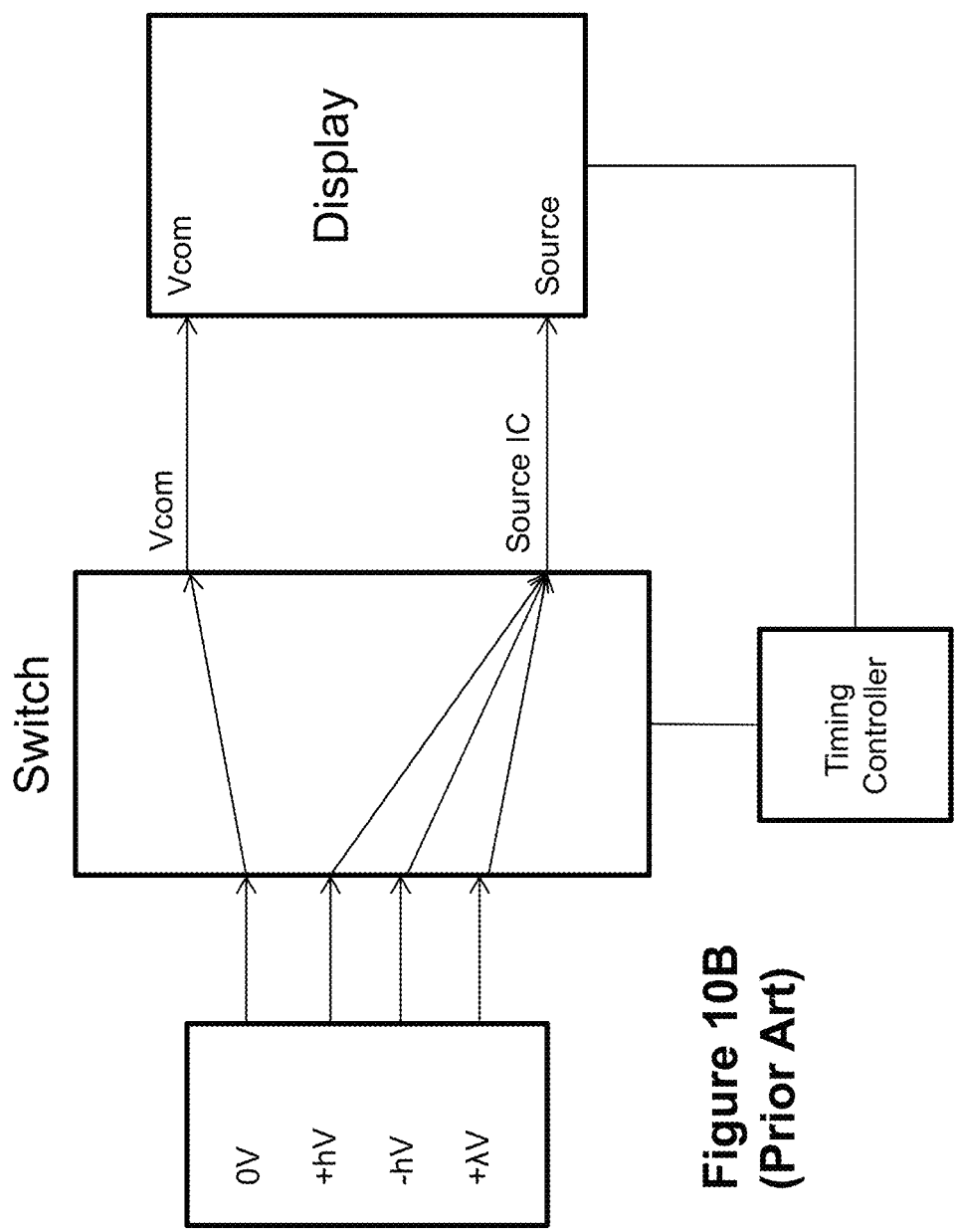
FIGS. 10B, 11B and 12B are diagrams for prior art driving methods.

FIG. 10B is a diagram illustrating the corresponding prior art method. In this diagram, there are three levels of voltage, +hV, −hV and +λV, which may be applied to a pixel electrode. Commercially available TFT backplane usually only has source IC which supports 0V, +hV and −hV. Therefore if the prior art method is utilized, there would be the need to modify the source IC to support an additional voltage option of +λV applied to the pixel electrode.

Figure 6:
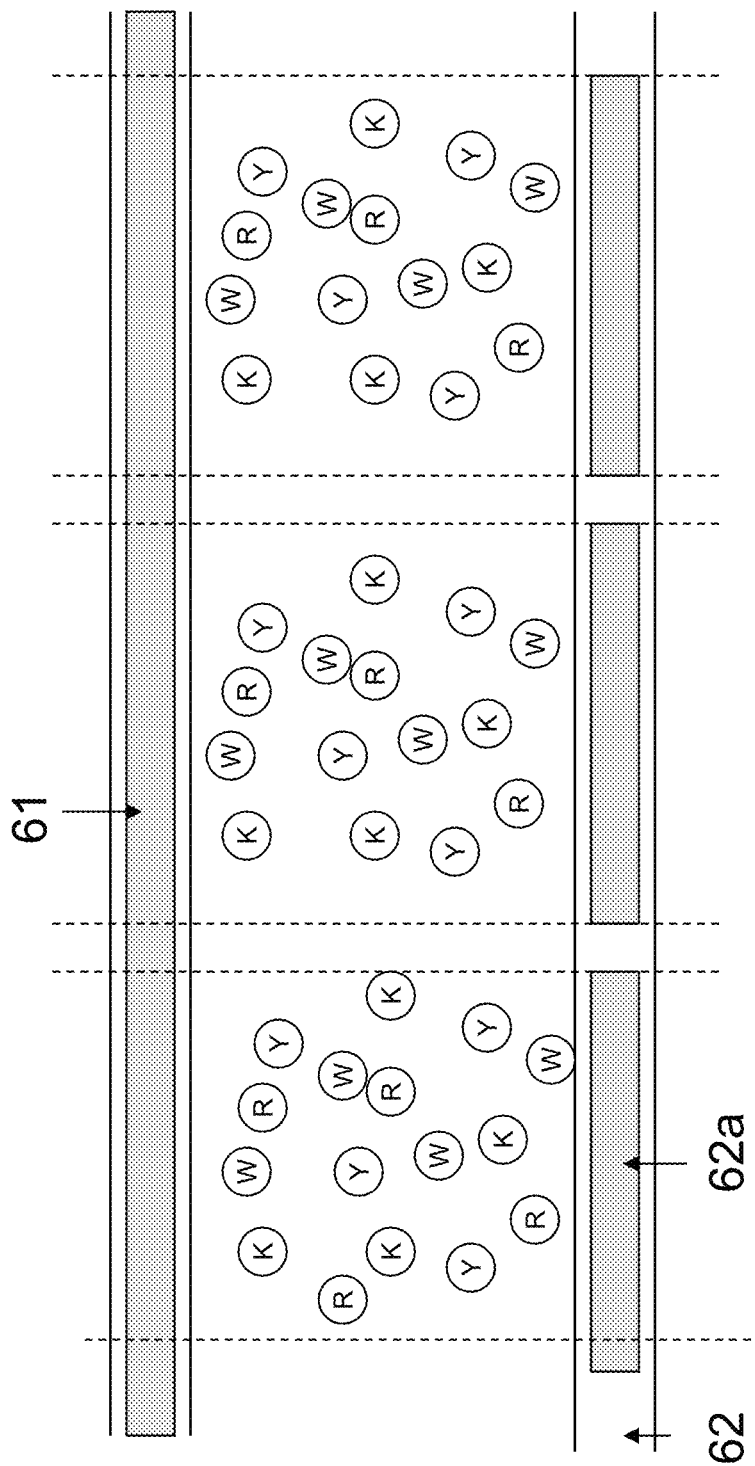
FIG. 6 depicts an electrophoretic fluid comprising four types of particles.

Four Types of Particles:

FIG. 6 depicts an alternative display device in which the electrophoretic fluid comprises four types of particles dispersed in a dielectric solvent or solvent mixture, as described in U.S. Provisional Application No. 61/824,887, which is incorporated herein by reference in its entirety. For ease of illustration, the four types of particles may be referred to as a first type of particles, a second type of particles, a third type of particles and a fourth type of particles. As an example shown in FIG. 6, the first type of particles is black particles (K); the second type of particles is yellow particles (Y); the third type of particles is red particles (R); and the fourth type of particles is white particles (W).

In this example, the black and yellow particles carry opposite charge polarities. For example, if the black particles are positively charged, the yellow particles are negatively charged. The red and white particles are also oppositely charged. However the charges carried by the black and yellow particles are stronger than the charges carried by the red and white particles.

For example, the black particles (K) carry a high positive charge; the yellow particles (Y) carry a high negative charge; the red (R) particles carry a low positive charge; and the white particles (W) carry a low negative charge. The driving sequence of this type of color display device is shown in FIG. 7.

Figure 7A:
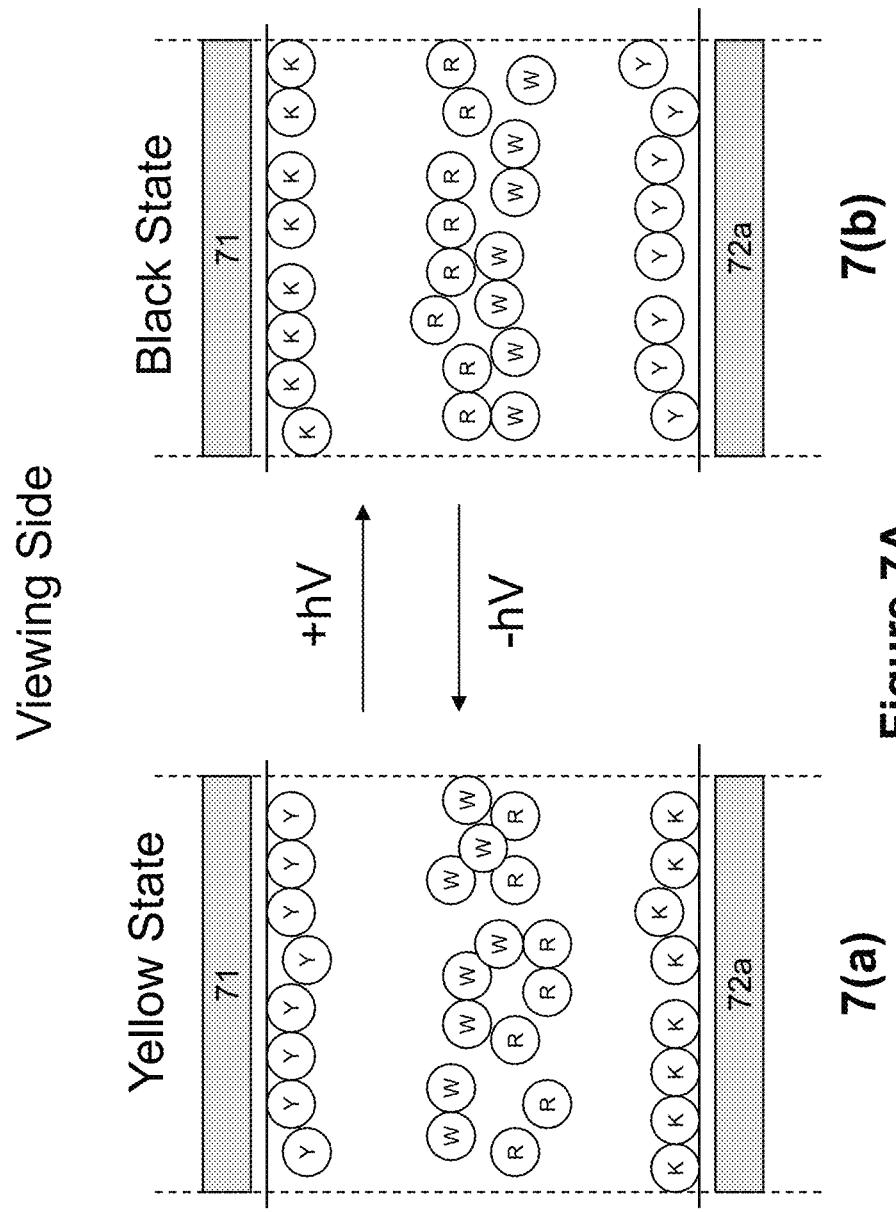
FIGS. 7A-7C illustrate the driving sequence of the four particle fluid system.

In FIG. 7A, when a high negative voltage potential difference (e.g., −hV) is applied to a pixel, the yellow particles (Y) are pushed to the common electrode (71) side and the black particles (K) are pulled to the pixel electrode (72a) side. The red (R) and white (W) particles, due to their lower charge levels, move slower than the higher charged black and yellow particles and therefore they stay between the common electrode and the pixel electrode, with white particles above the red particles. As a result, a yellow color is seen at the viewing side.

Also in FIG. 7A, when a high positive voltage potential difference (e.g., +hV) is applied to the pixel, the particle distribution would be reversed and as a result, a black color is seen at the viewing side.

Figure 7B:
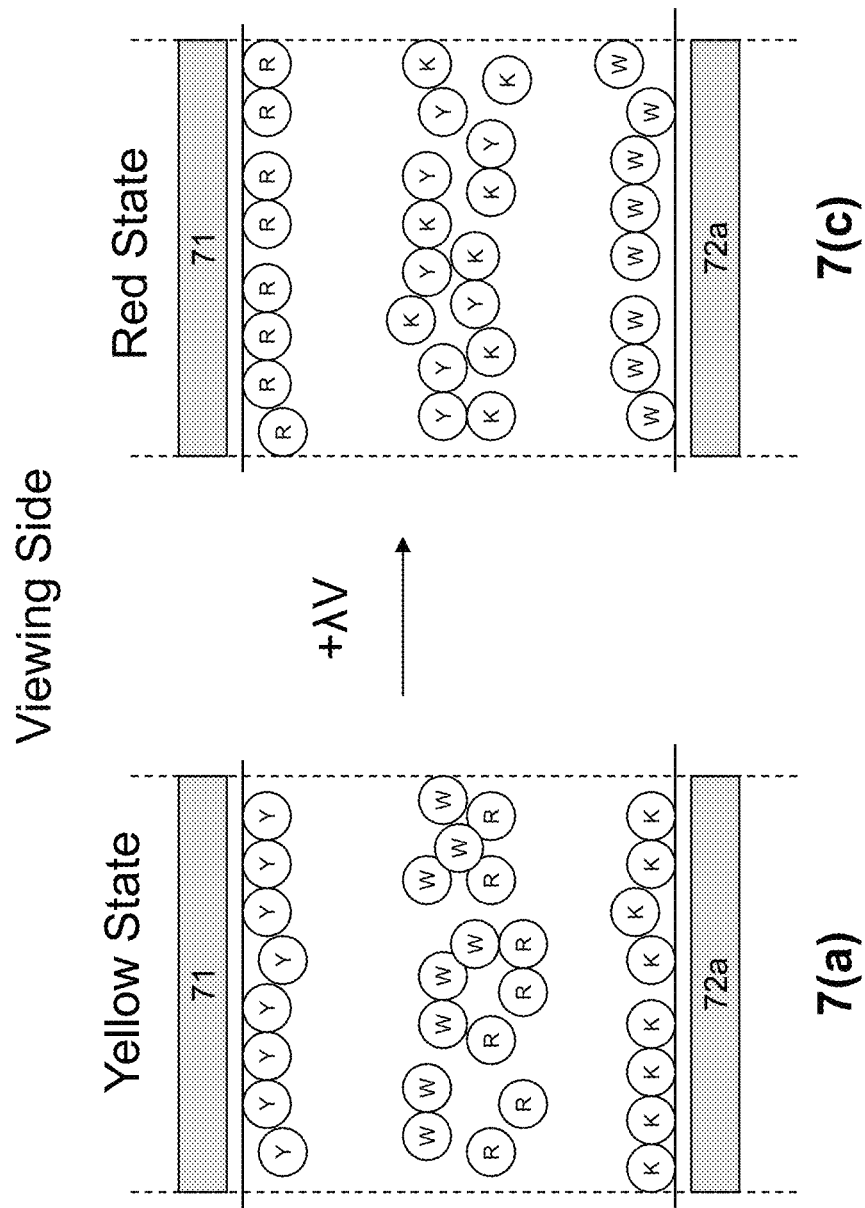

In FIG. 7B, when a lower positive voltage potential difference (e.g., +λV) is applied to the pixel in its yellow state, the yellow particles (Y) move towards the pixel electrode (72a) while the black particles (K) move towards the common electrode (71). However, when they meet while moving, because of their strong attraction to each other, they stop moving and remain between the common electrode and the pixel electrode. The lower charged (positive) red particles (R) move all the way towards the common electrode (71) side (i.e., the viewing side) and the lower charged (negative) white particles (W) move towards the pixel electrode (72a) side. As a result, a red color is seen.

Figure 7C:
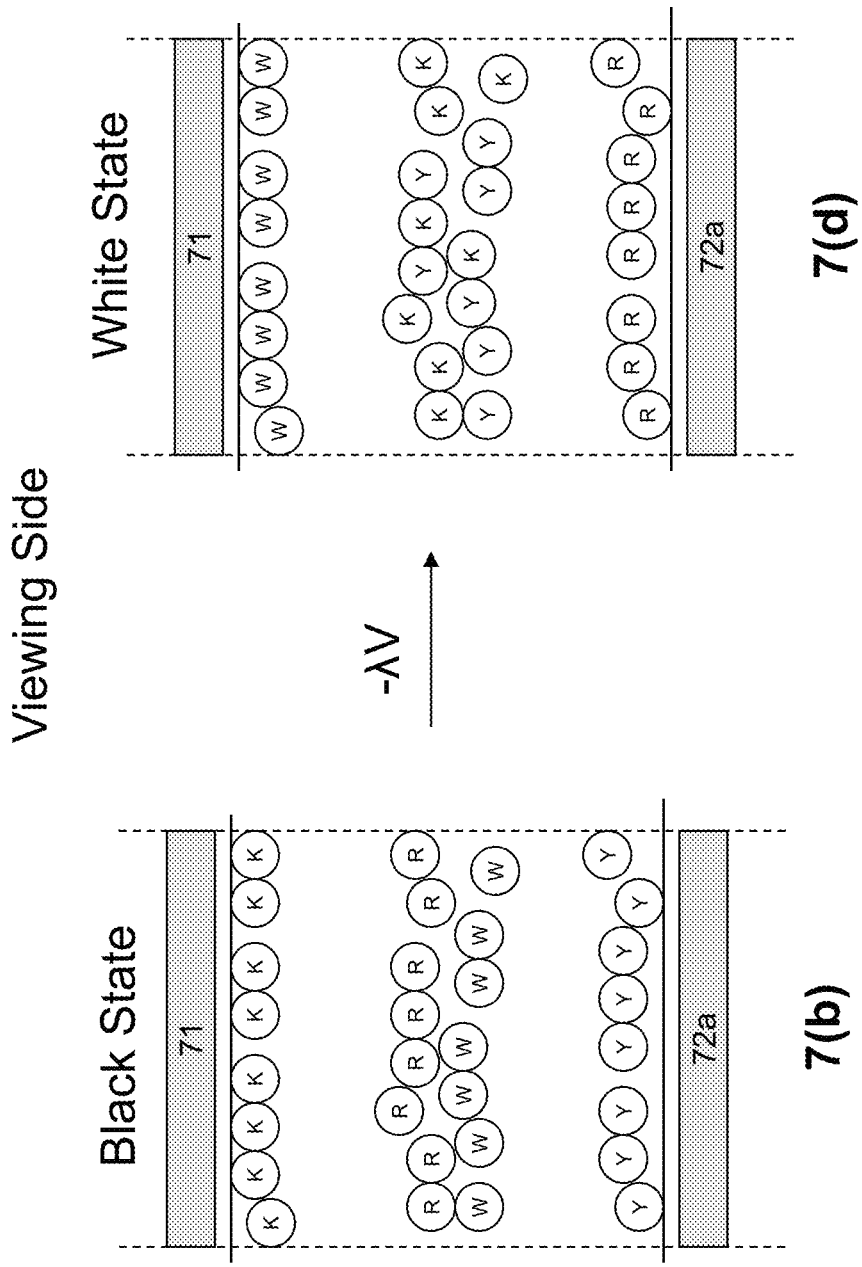

In FIG. 7C, when a lower negative voltage potential difference (e.g., $-\lambda V$) is applied to the pixel in its black state, the black particles (K) move towards the pixel electrode (72a) while the yellow particles (Y) move towards the common electrode (71). When the black and yellow particles meet, because of their strong attraction to each other, they stop moving and remain between the common electrode and the pixel electrode. The lower charged (negative) white particles (W) move all the way towards the common electrode side (i.e., the viewing side) and the lower charged (positive) red particles (R) move towards the pixel electrode side. As a result, a white color is seen.

It is also noted that in FIGS. 7B and 7C, while the low driving voltages applied ($+\lambda V$ or $-\lambda V$) are not sufficient to separate the stronger charged black and yellow particles, they, however, are sufficient to separate, not only the two types of oppositely charged particles of lower charge intensity, but also the lower charged particles from the stronger charged particles of opposite charge polarity.

It is noted that the lower voltage ($+\lambda V$ or $-\lambda V$) applied usually has a magnitude of about 5% to about 50% of the magnitude of the full driving voltage required to drive the pixel from the black state to the yellow state ($-hV$) or from the yellow state to the black state ($+hV$). In one embodiment, $+hV$ and $-hV$ may be $+15V$ and $-15V$, respectively and $+\lambda V$ and $-\lambda V$ may be $+3V$ and $-3V$, respectively. In addition, it is noted that the magnitudes of $+hV$ and $-hV$ may be the same or different. Likewise, the magnitude of $+\lambda V$ and $-\lambda V$ may be the same or different.

Figure 8A:
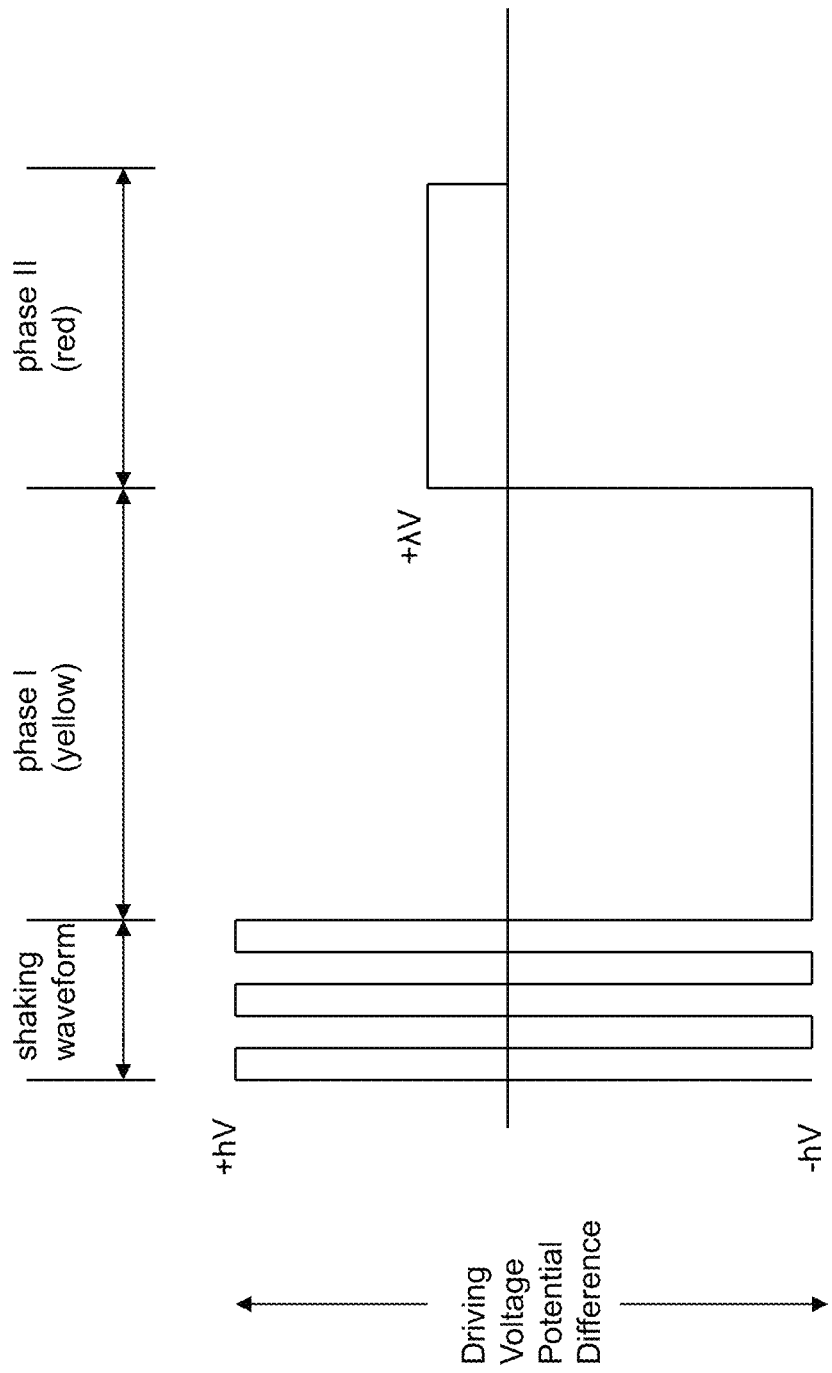
FIGS. 8A, 8B and 9 illustrate a driving method of the present invention for the four particle fluid system.
Figure 8B:
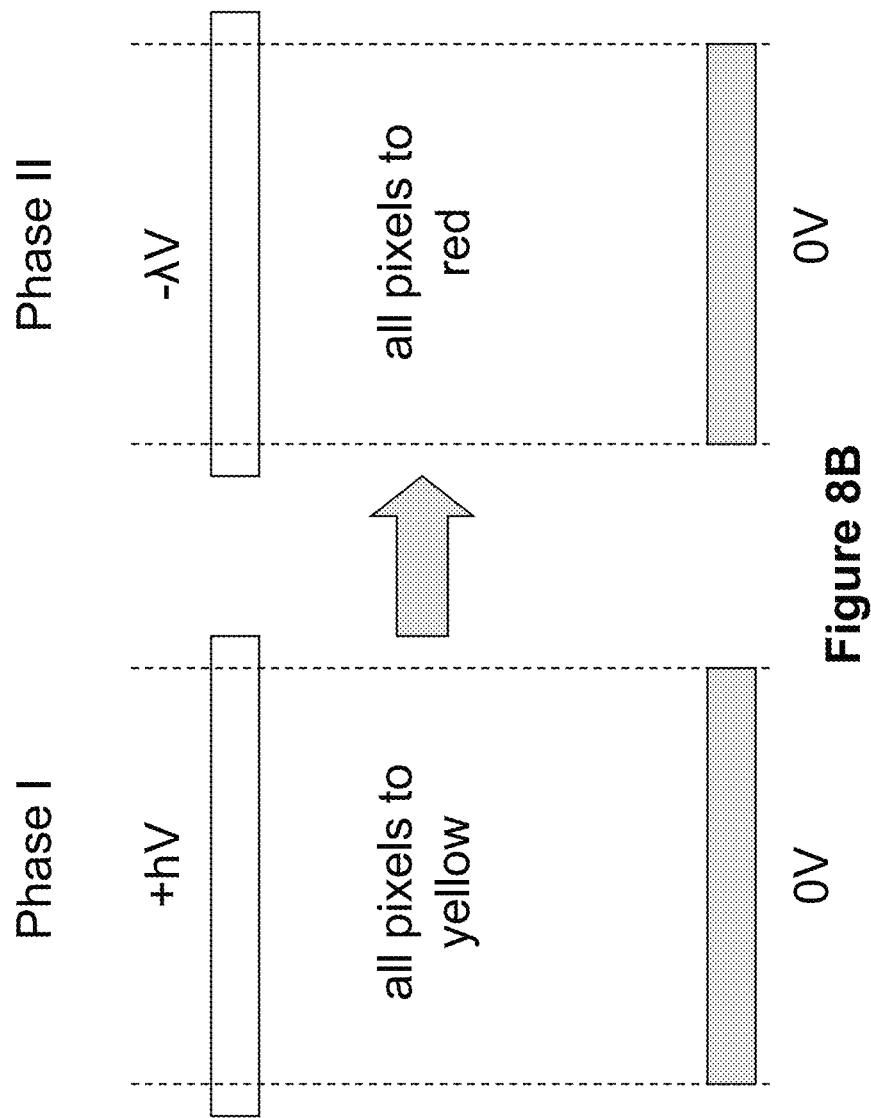

FIGS. 8A and 8B illustrate the initial step of the present driving method for the four particle system and this step is applied to all pixels. In phase I, the common electrode shared by all pixels is applied a $+hV$ while all pixel electrodes are at 0V, resulting in a driving voltage potential difference of $-hV$ for all pixels which drive all of them to the yellow state. In phase II, $-\lambda V$ is applied to the common electrode while all pixel electrodes still remain at 0V, resulting in a driving voltage potential difference of $+\lambda V$, which drives all pixels to the red state. In this initial step, all pixel electrodes remain at 0V while the common electrode is modulated, switching from $+hV$ to $-\lambda V$.

The shaking waveforms as described for FIG. 4 may also be applied in this case.

Figure 9:
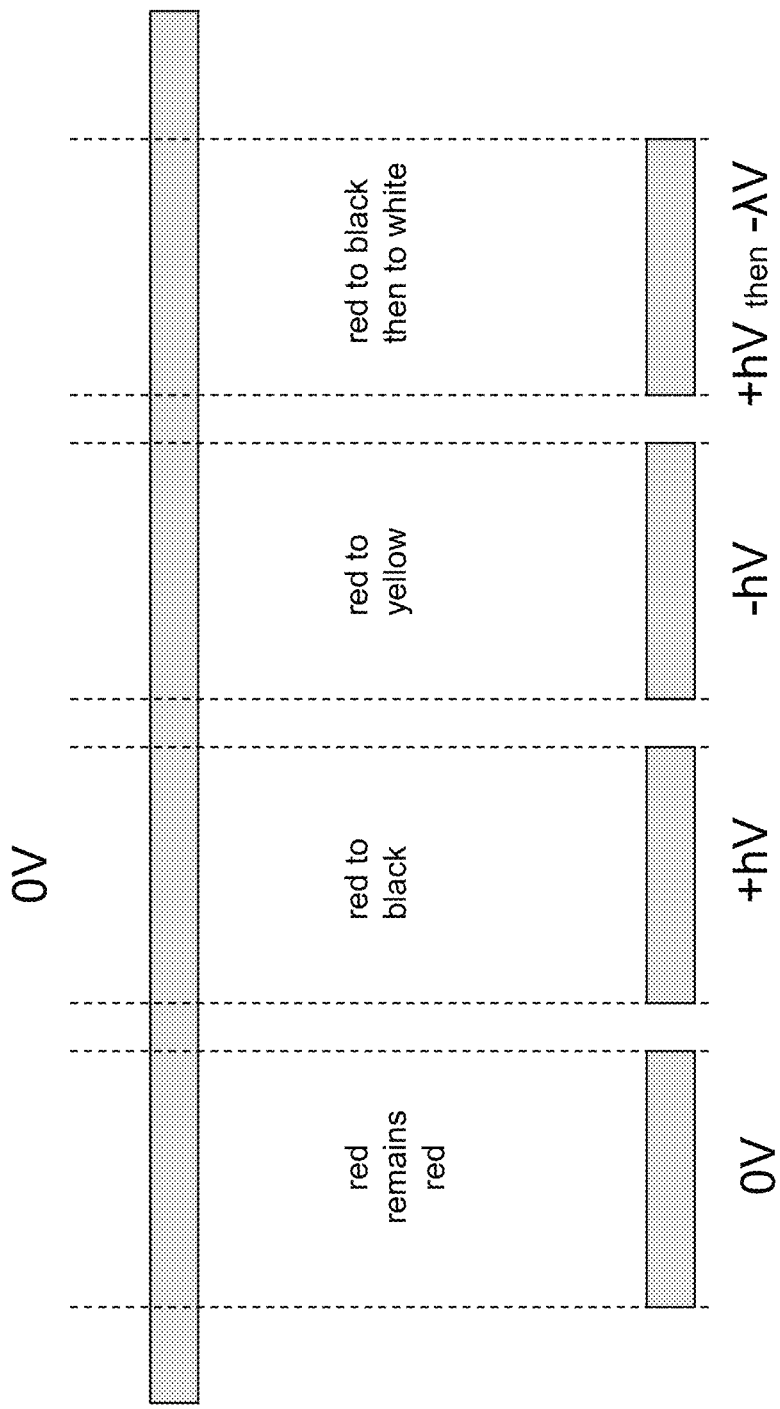

FIG. 9 illustrates the next step of the driving method. In this step, the common electrode is grounded at 0V while different voltages are applied to the pixel electrodes. For pixels to remain in the red state, no voltage is applied to the corresponding pixel electrodes, resulting in no driving voltage potential difference. For pixels to be in the black state, a $+hV$ is applied to the corresponding pixel electrodes. For pixels to be in the yellow state, a $-hV$ is applied to the corresponding pixel electrodes. For pixels to be in the white state, a $+hV$, followed by a $-\lambda V$ is applied to the corresponding pixels.

With this driving method in which the common electrode is modulated in the initial step, the backplane system would only need to have each pixel electrode at four different levels of voltage, 0V, $+hV$, $-hV$ and $-\lambda V$ which is much simplified than the backplane system used in the previous method in which the system would be required to have each pixel at five different levels of voltage, 0V, $+hV$, $-hV$, $+\lambda V$ and $-\lambda V$.

Figure 11A:
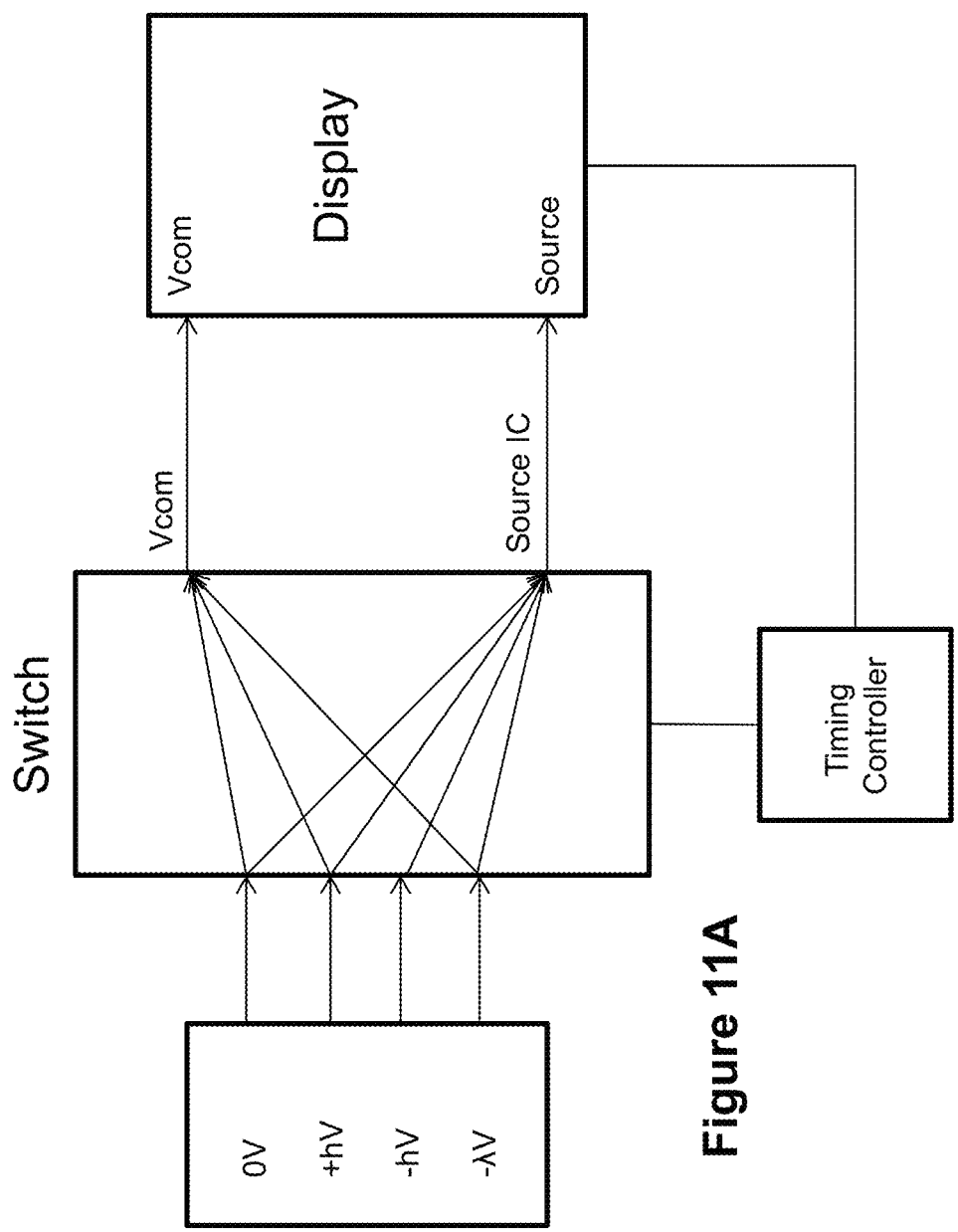

FIG. 11A is a simplified diagram illustrating the implementation of the present driving method. As shown, there are three different levels of voltage, 0V, $+hV$ and $-\lambda V$, which may be applied to the common electrode (Vcom) and there are four different levels of voltage, 0V, $+hV$, $-hV$ and $-\lambda V$, which may be applied to the pixel electrode.

Figure 11B:
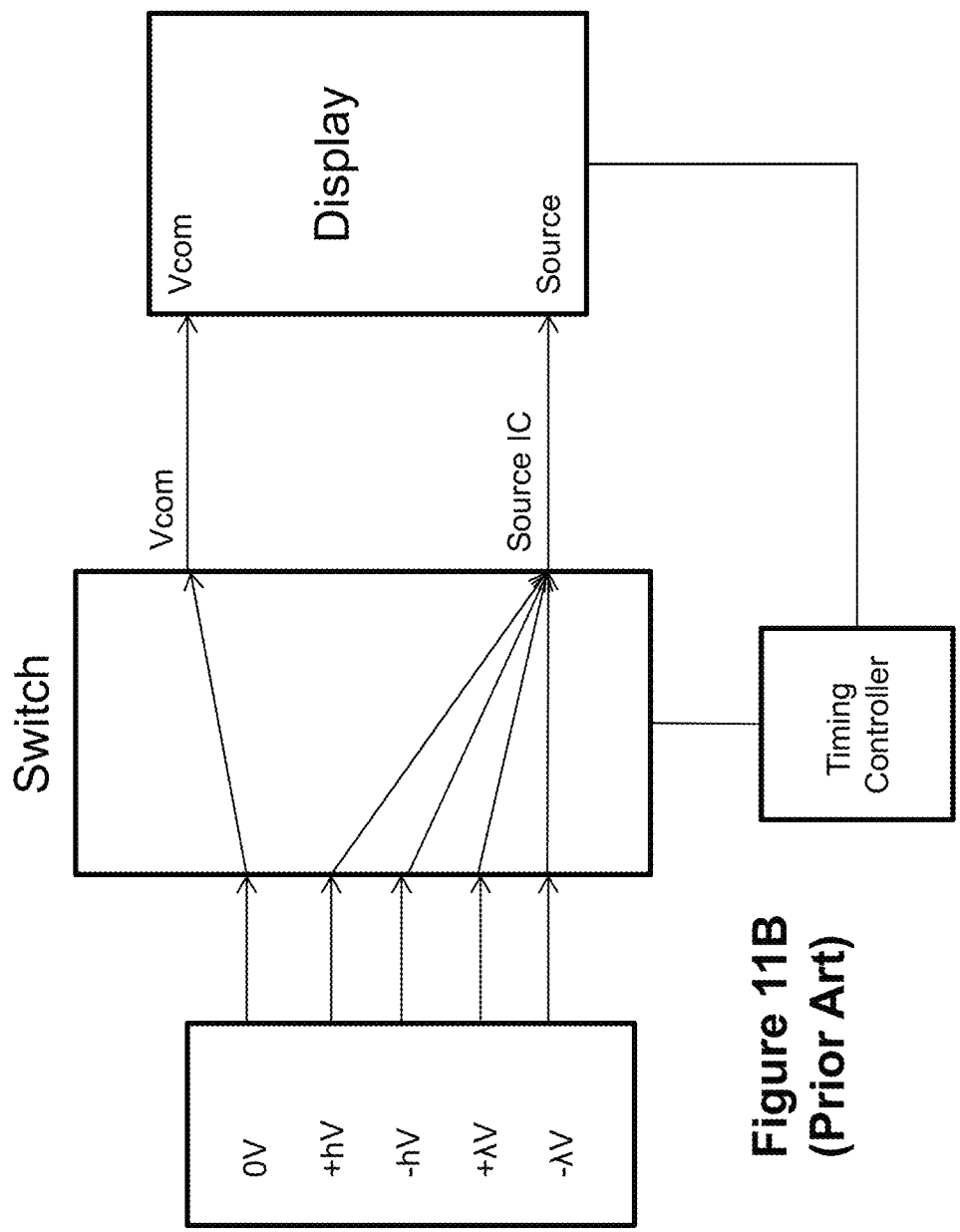

FIG. 11B is a diagram illustrating the corresponding prior art method. In this diagram, there are four levels of voltage, $+hV$, $-hV$, $+-\lambda V$ and $-\lambda V$, which may be applied to a pixel electrode. Commercially available TFT backplane usually only has source IC which supports 0V, $+hV$ and $-hV$. Therefore if the prior art method is utilized, there would be the need to modify the source IC to support one additional voltage option of $+\lambda V$ applied to the pixel electrode, compared to the present driving method.

In the illustration above, in the initial step, all pixels are driven to the red state. However it is also possible to drive all pixels to the white state in the initial step (by keeping the pixel electrodes grounds and applying a $-hV$ followed by $+\lambda V$ to the common electrode), followed by driving pixels to be black from white to black ($+hV$), driving pixels to be yellow from white to yellow ($-hV$), and applying no driving voltage potential difference to white pixels to remain white. The pixels to be red are driven from white to yellow ($-hV$) and then from yellow to red ($+\lambda V$). In this scenario, the backplane system would only need to have each pixel electrode at four different levels of voltage, 0V, $+hV$, $-hV$ and $+\lambda V$.

Figure 12A:
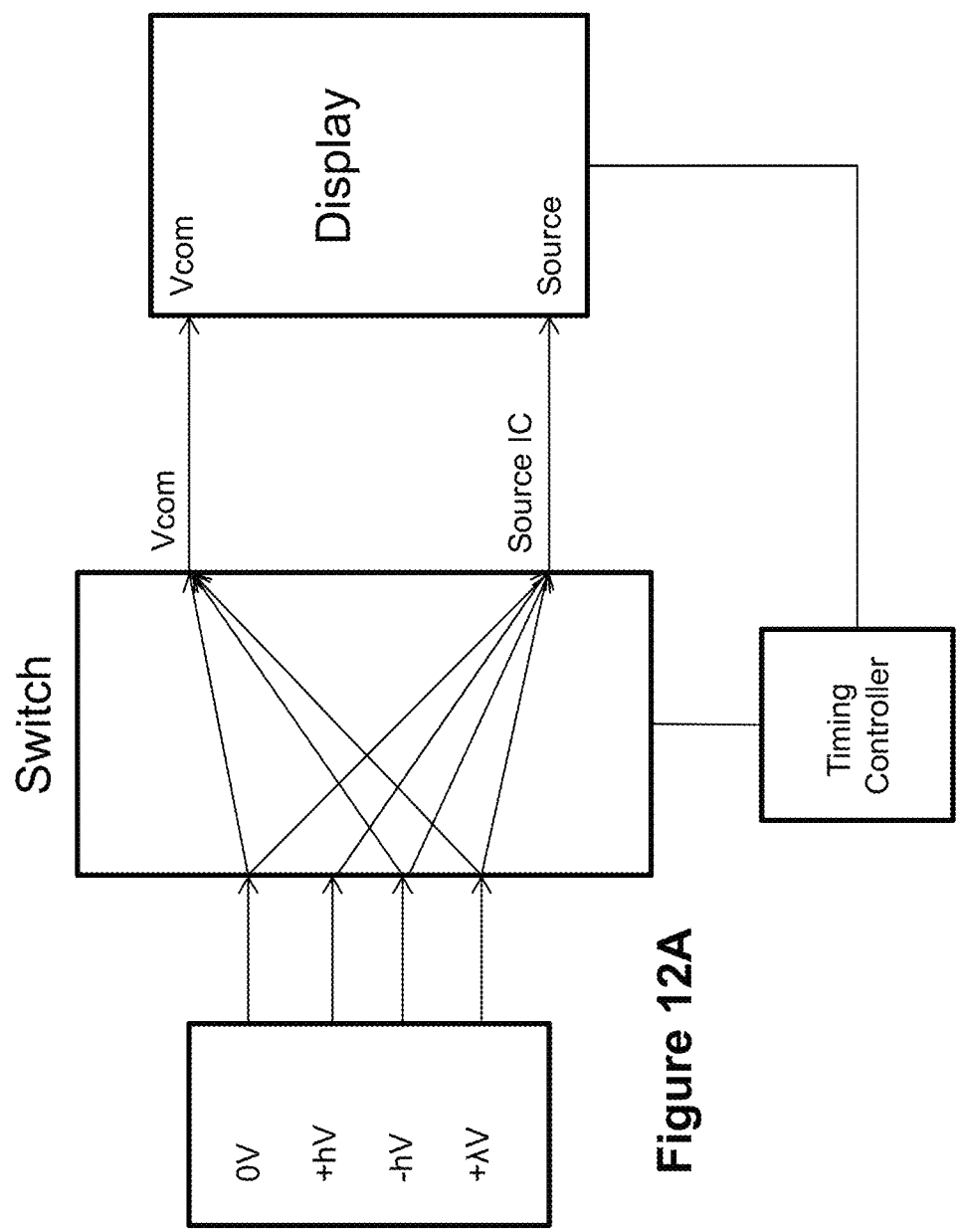

FIG. 12A is a simplified diagram illustrating the implementation of the present driving method. As shown, there are three different levels of voltage, 0V, $-hV$ and $+\lambda V$, which may be applied to the common electrode (Vcom) and there are four different levels of voltage, 0V, $+hV$, $-hV$ and $+\lambda V$, which may be applied to the pixel electrode.

Figure 12B:
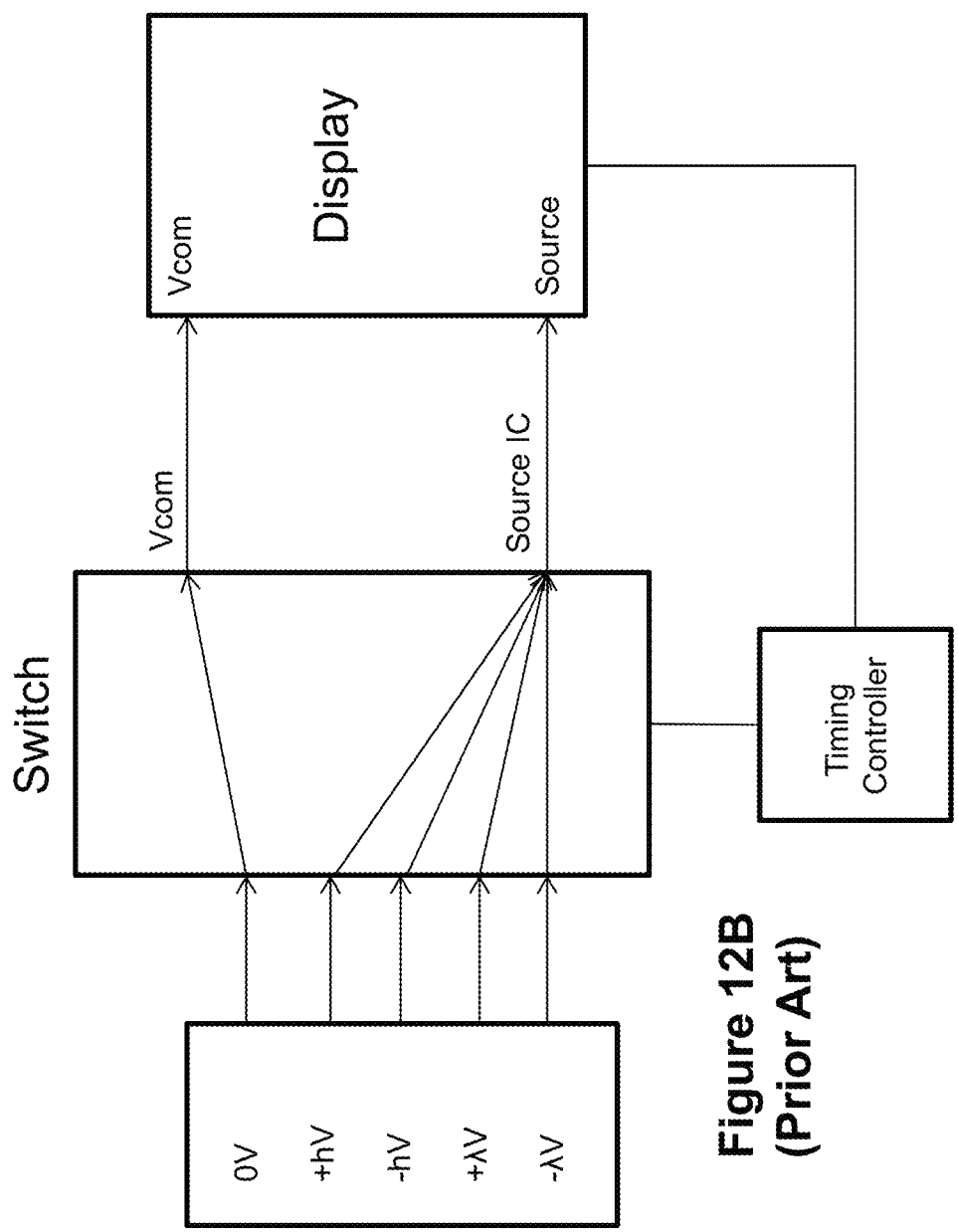

FIG. 12B is a diagram illustrating the corresponding prior art method. In this diagram, there are four levels of voltage, $+hV$, $-hV$, $+\lambda V$ and $-\lambda V$, which may be applied to a pixel electrode. Commercially available TFT backplane usually only has source IC which supports 0V, $+hV$ and $-hV$. Therefore if the prior art method is utilized, there would be the need to modify the source IC to support one additional voltage option of $-\lambda V$ applied to the pixel electrode, compared to the present driving method.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective and scope of the present invention. All such modifications are intended to be within the scope of the claims appended hereto.

The invention claimed is:

1. A driving method for a display device, wherein the display device comprises:
   (i) an electrophoretic fluid comprising a first type of particles, a second type of particles, a third type of particles and a fourth type of particles, all of which are dispersed in a solvent or solvent mixture, wherein the first and second types of particles are oppositely charged and the third and fourth types of particles are oppositely charged, and
   (ii) a plurality of pixels wherein each pixel is sandwiched between a common electrode and a pixel electrode; the method comprises the steps of:

a) applying no voltage to the pixel electrodes and applying a high voltage to the common electrode wherein the high voltage has a polarity opposite of the charge polarity of the second type of particles, to drive all pixels towards the color state of the second type of particles, b) applying no voltage to the pixel electrodes and applying a low voltage to the common electrode wherein the low voltage has a polarity opposite of the charge polarity of the third type of particles, to drive all pixels towards the color state of the third type of particles, and c) maintaining the common electrode grounded and applying different voltages to the pixel electrodes to drive pixels towards their desired color states.

2. The driving method of claim 1 wherein, in step (c), no voltage is applied to the pixel electrodes to maintain the pixels in the color state of the third type of particles.

3. The driving method of claim 1 wherein, in step (c), a high voltage is applied to the pixel electrodes wherein the high voltage has the same polarity as the first type of particles to drive the pixels towards the color state of the first type of particles.

4. The driving method of claim 1 wherein, in step (c), a high voltage is applied to the pixel electrodes wherein the high voltage has the same polarity as the second type of particles to drive the pixels towards the color state of the second type of particles.

5. The driving method of claim 1 wherein, in step (c), a high voltage is applied to the pixel electrodes wherein the high voltage has the same polarity as the first type of particles, followed by applying a low voltage to the pixel electrodes wherein the low voltage has the same polarity as the fourth type of particles to drive the pixels towards the color state of the fourth type of particles.

6. The driving method of claim 1, further comprising applying a shaking waveform prior to step (a).

7. The driving method of claim 1, wherein the first and third types of particles are positively charged and the second and fourth types of particles are negatively charged.

8. The driving method of claim 1, wherein the first type of particles is black particles, the second type of particles is yellow particles, the third type of particles is red particles and the fourth type of particles is white particles.

9. The driving method of claim 1, wherein the first type of particles is high positive particles, the second type of particles is high negative particles, the third type of particles is low positive particles and the fourth type of particles is low negative particles.

10. A driving method for a color display device comprising a plurality of pixels, wherein each of the pixels is sandwiched between a common electrode and a pixel electrode; the method comprises: a) driving all pixels towards a color state by modulating only the common electrode, and b) driving all pixels towards their desired color states by maintaining the common electrode grounded and applying different voltages to the pixel electrodes.

11. The method of claim 10, further comprising applying a shaking waveform.

12. A backplane system for driving a display device comprising an electrophoretic fluid comprising a first type of particles, a second type of particles and a third type of particles, all of which are dispersed in a solvent or solvent mixture, wherein the first type of particles carry a charge polarity while the second and third types of particles carry an opposite charge polarity; wherein the backplane system has only three levels of voltage, 0V, a high positive voltage and a high negative voltage.

* * * * *